(12) United States Patent
Kubota et al.

(10) Patent No.: US 9,537,942 B2
(45) Date of Patent: Jan. 3, 2017

(54) PROXY ASSIGNMENT APPARATUS AND METHOD FOR ASSIGNING PROXY

(71) Applicant: FUJITSU LIMITED, Kawasaki-shi, Kanagawa (JP)

(72) Inventors: Makoto Kubota, Kawasaki (JP); Hitoshi Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 14/172,522

(22) Filed: Feb. 4, 2014

(65) Prior Publication Data

US 2014/0289311 A1    Sep. 25, 2014

(30) Foreign Application Priority Data

Mar. 21, 2013 (JP) ................................. 2013-059084

(51) Int. Cl.
| | |
|---|---|
| *H04L 29/06* | (2006.01) |
| *H04L 29/08* | (2006.01) |
| *H04L 29/12* | (2006.01) |

(52) U.S. Cl.
CPC ......... *H04L 67/1036* (2013.01); *H04L 61/103* (2013.01); *H04L 61/1511* (2013.01); *H04L 61/2015* (2013.01)

(58) Field of Classification Search
CPC ..... H04L 29/06; H04L 29/06068; H04L 67/42
USPC ....................................................... 709/203
See application file for complete search history.

(56) References Cited

U.S. PATENT DOCUMENTS

| | | | | |
|---|---|---|---|---|
| 7,321,926 | B1* | 1/2008 | Zhang | G06F 9/5033 455/453 |
| 8,893,255 | B1* | 11/2014 | Martini | H04L 63/0884 709/238 |
| 2008/0092228 | A1* | 4/2008 | Baum | H04L 29/12018 726/13 |
| 2010/0217847 | A1* | 8/2010 | Cook | H04L 29/12584 709/222 |
| 2011/0231526 | A1* | 9/2011 | Hsieh | H04L 29/12283 709/220 |
| 2012/0185569 | A1* | 7/2012 | Das | H04W 4/006 709/219 |

(Continued)

FOREIGN PATENT DOCUMENTS

| | | | | |
|---|---|---|---|---|
| JP | 2010-130604 | | 6/2010 | |
| WO | 2014114228 | * | 1/2014 | ............. H04L 12/70 |

OTHER PUBLICATIONS

Patent Abstracts of Japan, Publication No. 2010-130604, Published Jun. 10, 2010.

*Primary Examiner* — Hee Soo Kim
*Assistant Examiner* — Elizabeth Kassa
(74) *Attorney, Agent, or Firm* — Staas & Halsey LLP

(57) ABSTRACT

A proxy assignment apparatus includes a processor or wired logic hardware configured to detect a first data request issued from a terminal apparatus for requesting first data. The processor or wired logic hardware is configured to determine whether a first proxy server that satisfies a condition exists, wherein the first proxy server corresponds to a media access control address of the terminal apparatus. The processor or wired logic hardware is configured to report a first internet protocol address of the first proxy server to the terminal apparatus when it is determined that the first proxy server exists.

10 Claims, 18 Drawing Sheets

(56) References Cited

U.S. PATENT DOCUMENTS

2015/0032905 A1* 1/2015 Celebi ................ H04L 61/2015
709/245

* cited by examiner

FIG. 5

| PRE-TRANSFER QUERY INFORMATION || POST-TRANSFER QUERY INFORMATION |
|---|---|---|
| TRANSMISSION-SOURCE IP | INQUIRY ID | INQUIRY ID |
| IP#1 | 1234 | 5678 |

PROXY ASSIGNMENT APPARATUS AND METHOD FOR ASSIGNING PROXY

CROSS-REFERENCE TO RELATED APPLICATION

This application is based upon and claims the benefit of priority of the prior Japanese Patent Application No. 2013-059084 filed on Mar. 21, 2013, the entire contents of which are incorporated herein by reference.

FIELD

The embodiments discussed herein are related to a proxy assignment apparatus and a method for assigning a proxy.

BACKGROUND

When corporate users and so on at their corporate location obtain application programs (which may hereinafter be referred to simply as "applications") by using their terminal apparatuses, they obtain the applications from application servers storing the applications through an in-house local area network (LAN) or a wide area network (WAN), such as the Internet. In this case, proxy servers that serve as relay apparatuses in an application layer are provided between the terminal apparatuses and the WAN, and the terminal apparatuses use the proxy servers to obtain the applications from the application servers.

When one terminal apparatus issues a request (application request) for an application to an application server, a proxy assignment apparatus assigns a guide-target proxy server from among the proxy servers to the terminal apparatus. The guide-target proxy server serves to guide the application request destined for an application uniform resource locator (URL) of the application server to be accessed. The application URL indicates a location where the requested application is stored. The guide-target proxy server, in place of the terminal apparatus, accesses the application URL to obtain and cache content data of the requested application. Thus, by accessing the guide-target proxy server to obtain the cache data in the guide-target proxy server, the terminal apparatus may obtain the requested application.

Related technique is disclosed in, for example, Japanese Laid-open Patent Publication No. 2010-130604.

The proxy assignment apparatus identifies a terminal apparatus that issues an application request by using an internet protocol (IP) address assigned to the terminal apparatus, and assigns a guide-target proxy server for the requested application to the terminal apparatus.

However, for example, in a system in which different IP addresses are assigned to the same terminal apparatus for respective domains, when the terminal apparatus moves from one domain to another, the IP address before the movement and the IP address after the movement differ from each other. Thus, even when the same terminal apparatus issues requests for the same application, the proxy assignment apparatus may assign different guide-target proxy servers to the same terminal apparatus, since the IP address of the terminal apparatus before the movement and the IP address of the terminal apparatus after the movement differ from each other. Consequently, cache data of the same application for the same terminal apparatus is redundantly registered in both of the guide-target proxy server before the movement and the guide-target proxy server after the movement.

SUMMARY

According to an aspect of the present invention, provided is a proxy assignment apparatus including a processor or wired logic hardware. The processor or wired logic hardware is configured to detect a first data request issued from a terminal apparatus. The first data request is for requesting first data. The processor or wired logic hardware is configured to determine whether a first proxy server that satisfies a condition exists. The condition is that the first proxy server corresponds to a media access control (MAC) address of the terminal apparatus. The processor or wired logic hardware is configured to report a first internet protocol (IP) address of the first proxy server to the terminal apparatus when it is determined that the first proxy server exists.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a query table;

DESCRIPTION OF EMBODIMENTS

Embodiments of a proxy assignment apparatus and a method for assigning a proxy disclosed herein will be described below in detail with reference to the accompanying drawings. The embodiments described hereinafter are not intended to limit the technology disclosed herein. The embodiments may also be combined together, as appropriate, within a range in which no contradiction occurs.

First Embodiment

Figure 1:
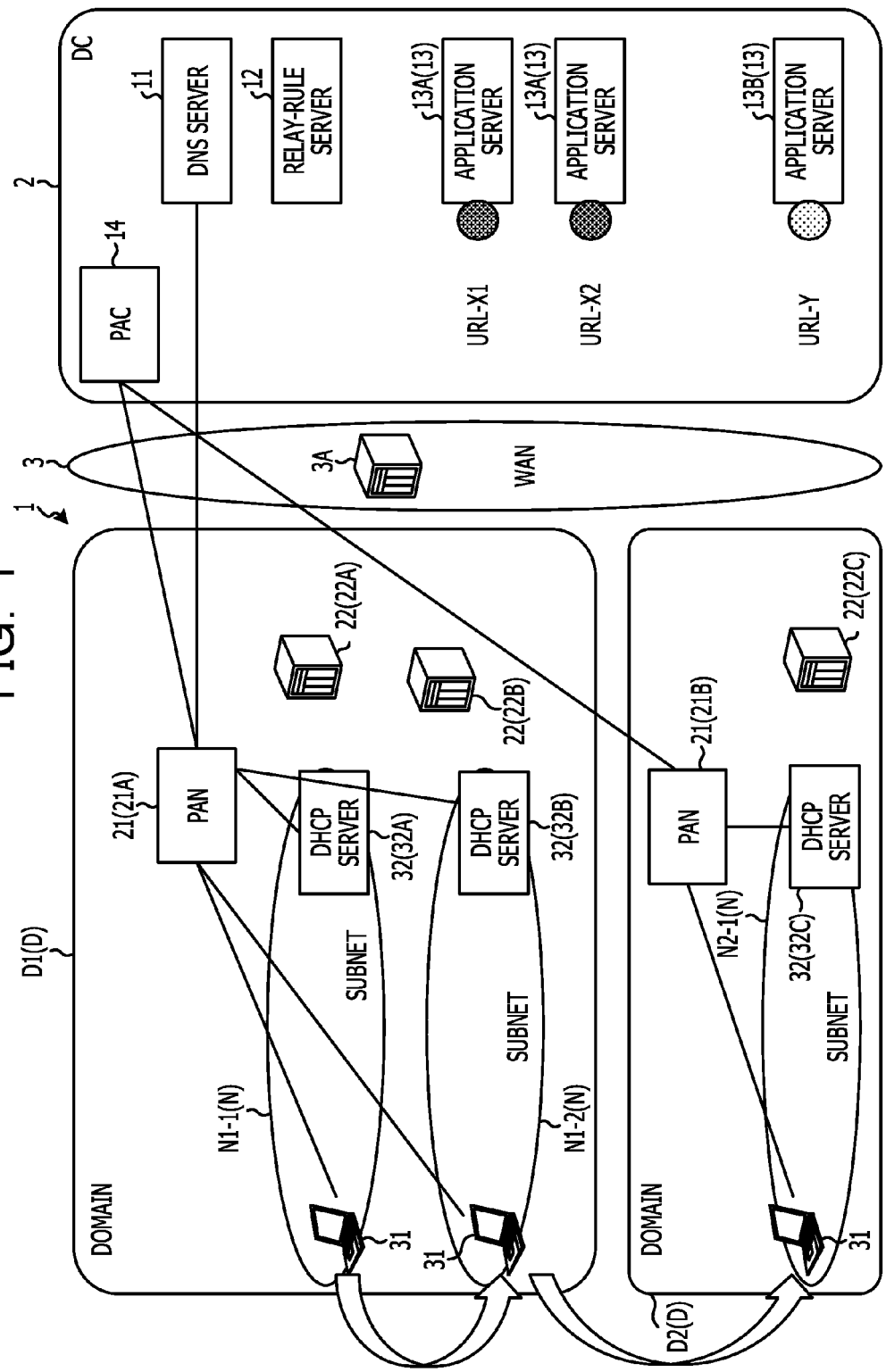
FIG. 1 is a block diagram illustrating an example of a data providing system according to a first embodiment.

FIG. 1 is a block diagram illustrating an example of a data providing system according to a first embodiment. A data providing system 1 illustrated in FIG. 1 includes a plurality of domains D (D1 and D2) and a data center (hereinafter simply referred to as a "DC") 2. The domains D and the DC 2 are connected through a WAN 3. Each domain D is, for example, a group for managing a collection of subnet addresses in corporate buildings in a region. The DC 2 includes a domain name system (DNS) server 11, a relay-rule server 12, a plurality of application servers 13 (13A and 13B), and a proxy assignment controller (hereinafter simply referred to as a "PAC") 14.

Each application server 13 is, for example, a storage server for storing applications and supplying the stored applications. The applications include, for example, not only applications that run according to a web protocol (Hypertext Transfer Protocol: HTTP), but also applications that run according to a protocol other than a web protocol, and so on. The relay-rule server 12 provides, for example, access control rules and transfer control rules for controlling whether or not access to the DNS server 11 or each application server 13 is permitted. The DNS server 11 is, for example, a management server for managing the plurality of application servers 13. The PAC 14 is, for example, a control server for managing proxy assignment apparatuses (proxy assignment executing nodes, hereinafter simply referred to as "PANs") 21 placed in the respective domains D.

The domain D1 has a plurality of subnets N (N1-1 and N1-2), the PAN 21 (21A), and a plurality of proxy servers 22 (22A and 22B). In addition, each subnet N includes a terminal apparatus 31 and a dynamic host configuration protocol (DHCP) server 32 (32A or 32B). The terminal apparatus 31 is used by a user and is, for example, a personal computer, a smartphone, a tablet terminal, or sensor equipment having a communication function. The DHCP server 32 is, for example, an IP-address assignment server for automatically assigning information, such as an IP address, to the terminal apparatus 31 and equipment in the subnet N. The DHCP server 32 assigns an IP address to the terminal apparatus 31 in the subnet N managed by the DHCP server 32 and reports the assigned IP address and a media access control (MAC) address of the terminal apparatus 31 to the PAN 21. The DHCP server 32 assigns (reports), to the terminal apparatus 31, the DNS server 11 to be used by the terminal apparatus 31.

In place of the terminal apparatus 31, the proxy server 22 in the domain D accesses, via a proxy server 3A in the WAN 3, the application server 13 in which an application requested by the terminal apparatus 31 is stored. The proxy server 22 then obtains content data of the requested application from the application server 13 and caches the content data. In response to an application request from the terminal apparatus 31, the PAN 21 assigns, from among plurality of proxy servers 22 in the domain D, a guide-target proxy server 22 handling the requested application to the terminal apparatus 31 that issued the application request. For example, in response to an application request from the terminal apparatus 31, the PAN 21A in the domain D1 is assumed to assign, from among the proxy servers 22A and 22B, the guide-target proxy server 22A for the requested application. The PAN 21 selects the guide-target proxy server 22 from among the plurality of proxy servers 22, considering the amount of central processing unit (CPU) load and the amount of cache of each proxy server 22. As a result, it is possible to perform adjustment so that the loads of the guide-target proxy servers 22 may not become unbalanced. Although the configuration of the domain D1 has been described above for convenience of description, a PAN 21B in the domain D2 also has substantially the same configuration and thus redundant descriptions are not given hereinafter. The domain D2 has a subnet N (N2-1), the PAN 21 (21B), and a proxy server 22 (22AC). The subnet N2-1 includes a terminal apparatus 31 and a DHCP server 32 (32C).

Figure 2:
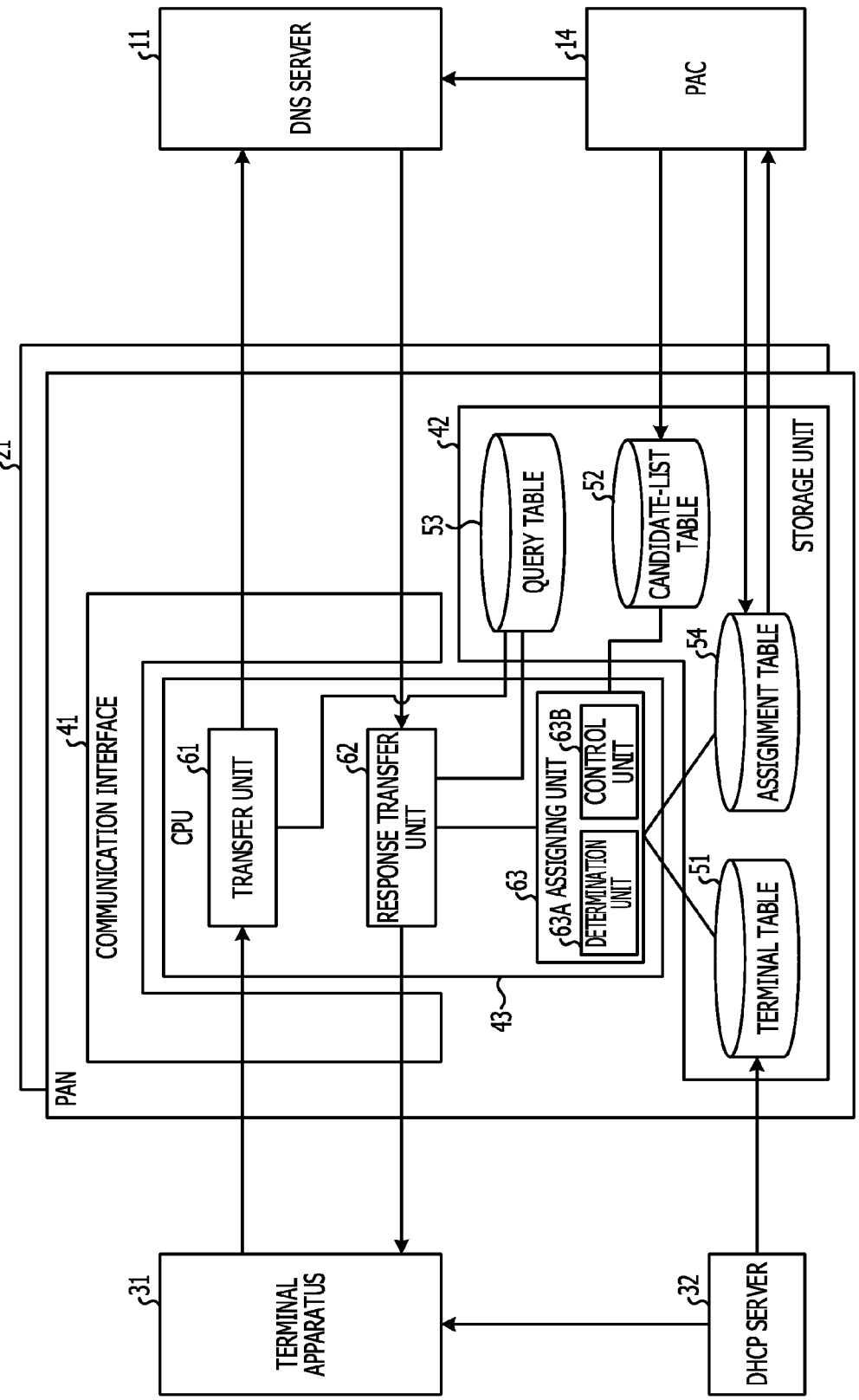
FIG. 2 is a block diagram illustrating an example of a PAN.

FIG. 2 is a block diagram illustrating an example of the PAN 21. The PAN 21 illustrated in FIG. 2 includes a communication interface 41, a storage unit 42, and a CPU 43. The communication interface 41, for example, connects to and communicates with the DHCP servers 32 and terminal apparatuses 31 in the domain D1 and also communicates and connects to the WAN 3. The communication interface 41 connects to and communicates with the DNS server 11 and the PAC 14 through the WAN 3. The storage unit 42 stores therein a terminal table 51, a candidate-list table 52, a query table 53, and an assignment table 54.

Figure 3:
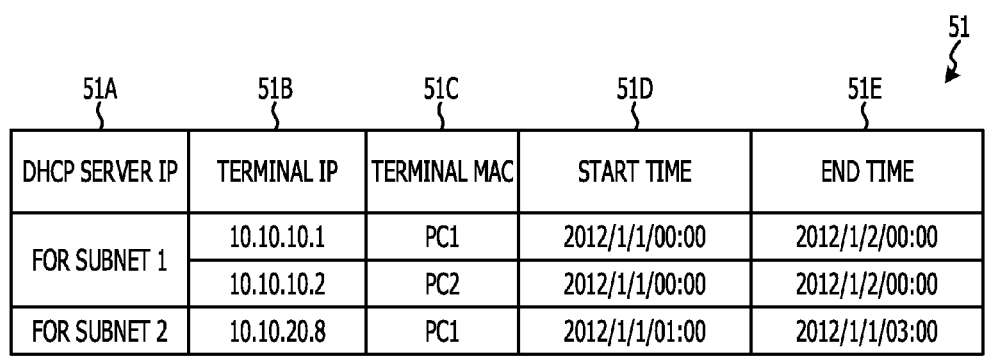
FIG. 3 illustrates an example of a terminal table.

FIG. 3 illustrates an example of the terminal table 51. The terminal table 51 illustrated in FIG. 3 is, for example, a terminal storage unit for managing address information of the terminal apparatuses 31 that are located in the domain D1. The terminal table 51 manages a DHCP-server IP 51A, a terminal IP 51B, a terminal MAC 51C, start time 51D, and end time 51E in association with each other. The DHCP-server IP 51A is an IP address of the DHCP server 32 that has assigned an IP address to the terminal apparatus 31. The terminal IP 51B is an IP address assigned to the terminal apparatus 31 by the DHCP server 32. The terminal MAC 51C is an apparatus-unique address of the terminal apparatus 31. The start time 51D indicates the date and time of starting of an IP-address lease in which the DHCP server 32 assigns an IP address to the terminal apparatus 31. The end time 51E is the scheduled date and time of ending of the IP-address lease in which the DHCP server 32 assigns the IP address to the terminal apparatus 31.

Figure 4:
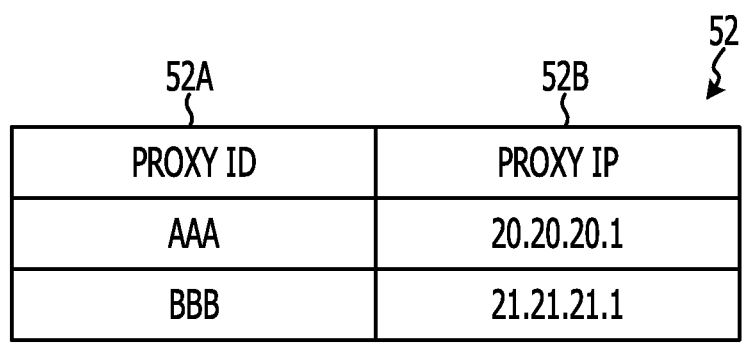
FIG. 4 illustrates an example of a candidate-list table.

FIG. 4 illustrates an example of the candidate-list table 52. The candidate-list table 52 illustrated in FIG. 4 manages, as guide-target candidates, the proxy servers 22 in the same domain D managed by the PAN 21. The candidate-list table 52 manages a proxy identifier (ID) 52A and a proxy IP 52B in association with each other. Each proxy ID 52A is an ID of the proxy server 22 that is a guide-target candidate. Each proxy IP 52B is an IP address of the proxy server 22 that is a guide-target candidate. Guide-target candidates in the domain D1 managed by the PAN 21A are, for example, proxy servers 22A and 22B.

FIG. 5 illustrates an example of the query table 53. In the query table 53 illustrated in FIG. 5, for example, pre-transfer query information and post-transfer query information in transferring a DNS query by the PAN 21 are managed in association with each other. The query table 53 manages a transmission-source IP 53A, an inquiry ID 53B in the pre-transfer query information, and an inquiry ID 53C in the post-transfer query information in association with each other. The transmission-source IP 53A is a transmission-source IP address included in a DNS query. The inquiry ID 53B in the pre-transfer query information is an ID for identifying a DNS query. The inquiry ID 53C in the post-transfer query information is an ID for identifying a DNS query to be transferred. By referring to the query table 53, the PAN 21 may transfer, for example, a DNS query from the terminal apparatus 31 to the DNS server 11. In addition, by referring to the query table 53, the PAN 21 may transfer, from the DNS server 11 to the terminal apparatus 31, for example, a DNS response corresponding to the DNS query.

Figure 6:
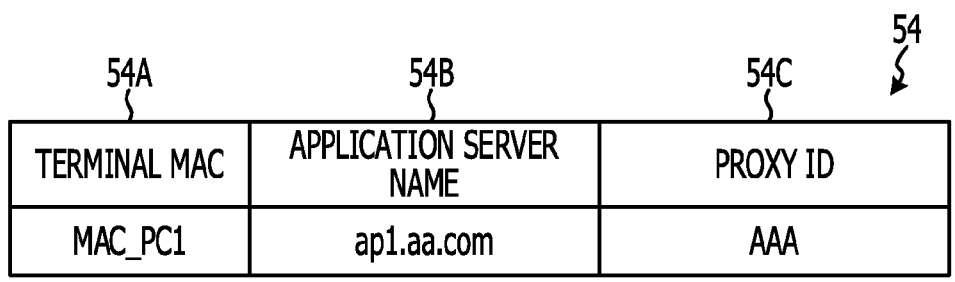
FIG. 6 illustrates an example of an assignment table.

FIG. 6 illustrates an example of the assignment table 54. The assignment table 54 illustrated in FIG. 6 is, for example, an assignment storage unit for managing a terminal MAC 54A, an application server name 54B, and a proxy ID 54C in association with each other. The terminal MAC 54A is a MAC address of a terminal apparatus 31 that issues an application request. The application server name 54B is used to identify an application server 13 in which a requested application is stored. The proxy ID 54C is an ID for identifying a guide-target proxy server 22 for the application server 13 in which the requested application is stored. The PAN 21 identifies the MAC address of the terminal apparatus 31 that has issued an application request and the name of an application server (requested-application server) to be requested. By referring to the assignment table 54, the PAN 21 determines the ID of an already-assigned guide-target proxy server 22 corresponding to the MAC address of a terminal apparatus 31 that has issued an application request and the name of the requested-application server.

The CPU 43 illustrated in FIG. 2 includes a transfer unit 61, a response transfer unit 62, and an assigning unit 63. The CPU 43 reads a proxy assignment program (not illustrated) stored in the storage unit 42 and performs the transfer unit 61, the response transfer unit 62, and the assigning unit 63 as processes in accordance with the read proxy assignment program. Upon receiving a DNS query from the terminal apparatus 31, the transfer unit 61 transfers the DNS query to the DNS server 11. During the transfer, the transfer unit 61 obtains the transmission-source IP 53A and the inquiry ID 53B in the DNS query and registers the transmission-source IP 53A and the inquiry ID 53B in the query table 53 in association with each other. In addition, during the transfer of the DNS query to the DNS server 11, the transfer unit 61 registers, in the query table 53, the inquiry ID in the post-transfer DNS query as the inquiry ID 53C in the post-transfer query information.

The assigning unit 63 includes a determination unit 63A and a control unit 63B. Upon detecting an application request transmitted from the terminal apparatus 31, the determination unit 63A refers to the assignment table 54 to determine whether or not there is an already-assigned guide-target proxy server 22 corresponding to the MAC address of the terminal apparatus 31 and the name (requested-application-server name) of the requested-application server. When there is the already-assigned guide-target proxy server 22, the control unit 63B transmits via the response transfer unit 62, to the terminal apparatus 31 that has issued the application request, a DNS response to which the IP address of the already-assigned guide-target proxy server 22 is attached.

The DNS server 11 transmits a DNS response to the PAN 21 as a response to the DNS-query transferred by the PAN 21. Upon receiving the DNS response from the DNS server 11, the PAN 21 refers to the inquiry ID 53C in the post-transfer query information in the query table 53 to identify the IP address in the transmission-source IP 53A corresponding to the inquiry ID 53C. In addition, the PAN 21 transfers the DNS response to the terminal apparatus 31 having the identified IP address in the transmission-source IP 53A.

Figure 7:
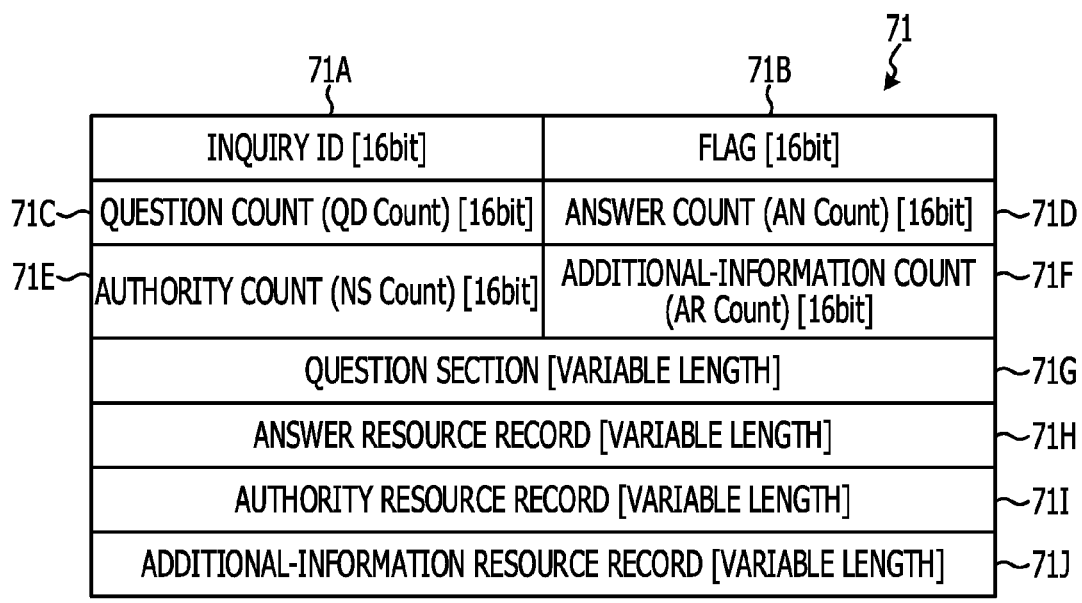
FIG. 7 illustrates an example of a format structure of a packet.

FIG. 7 illustrates an example of a format structure of a packet. A packet 71 illustrated in FIG. 7 is a packet of, for example, a DNS query or a DNS response. The packet 71 has an inquiry ID 71A, a flag 71B, a question count 71C, an answer count 71D, an authority count 71E, and an additional-information count 71F. The packet 71 further has a question section 71G, an answer resource record 71H, an authority resource record 71I, and an additional-information resource record 71J. The inquiry ID 71A is an ID with a 16 bit structure, and the same ID value is used for a DNS query and a DNS response thereof. The flag 71B indicates the type of the packet 71 by using a 16 bit structure, and is, for example, a flag identifying whether the packet 71 is a DNS query or a DNS response. The question count 71C indicates, for example, the number of questions in the DNS query. The answer count 71D indicates, for example, the number of answers in the DNS response. The authority count 71E indicates, for example, the number of DNS servers 11 that have generated the answers in the DNS response. The additional-information count 71F indicates, for example, the number of pieces of added information in the DNS response. The question section 71G indicates an application server name about which the DNS server 11 is to be queried. The answer resource record 71H includes the details of an answer from the DNS server 11 and an IP address corresponding to the application server name. The authority resource record 71I includes authority information (a DNS server name) of the DNS server 11. The additional-information resource record 71J is, for example, additional information of an answer of the DNS server 11.

When one terminal apparatus 31 moves from one domain D to another, the DHCP server 32 assigns a new IP address to the terminal apparatus 31. The DHCP server 32 also assigns, as a PAN 21 associated with the DNS server 11 for the terminal apparatus 31, the PAN 21 located in the domain D to which the terminal apparatus 31 has moved. The DHCP server 32 then reports the IP address and the MAC address of the terminal apparatus 31 to the PAN 21 as lease information. The PAN 21 manages, in the terminal table 51, the MAC address unique to the terminal apparatus 31, as well as the IP address thereof. The PAN 21 refers to the terminal table 51 and uses the MAC address to identify the terminal apparatus 31 that has issued the application request, associates the MAC address corresponding to the transmission-source IP address in the DNS query transmitted from the terminal apparatus 31 with the application server name, and assigns the guide-target proxy server 22 to the terminal apparatus 31.

The application servers 13 in the DC 2 are storage servers in which applications are stored. The application servers 13 include an application server 13A that supplies an application via the guide-target proxy server 22 and an application server 13B that supplies an application without using the guide-target proxy server 22. The application server 13A that supplies an application via the guide-target proxy server 22 is determined by a contract with an application provider. The application server 13B is used when there is no contract with the application provider.

Upon receiving the IP address of the guide-target proxy server 22 from the PAN 21, each terminal apparatus 31 obtains cache data related to a requested application via the guide-target proxy server 22. The cache data includes access control rules, transfer control rules, and so on in addition to the content data related to the requested application.

Figure 8:
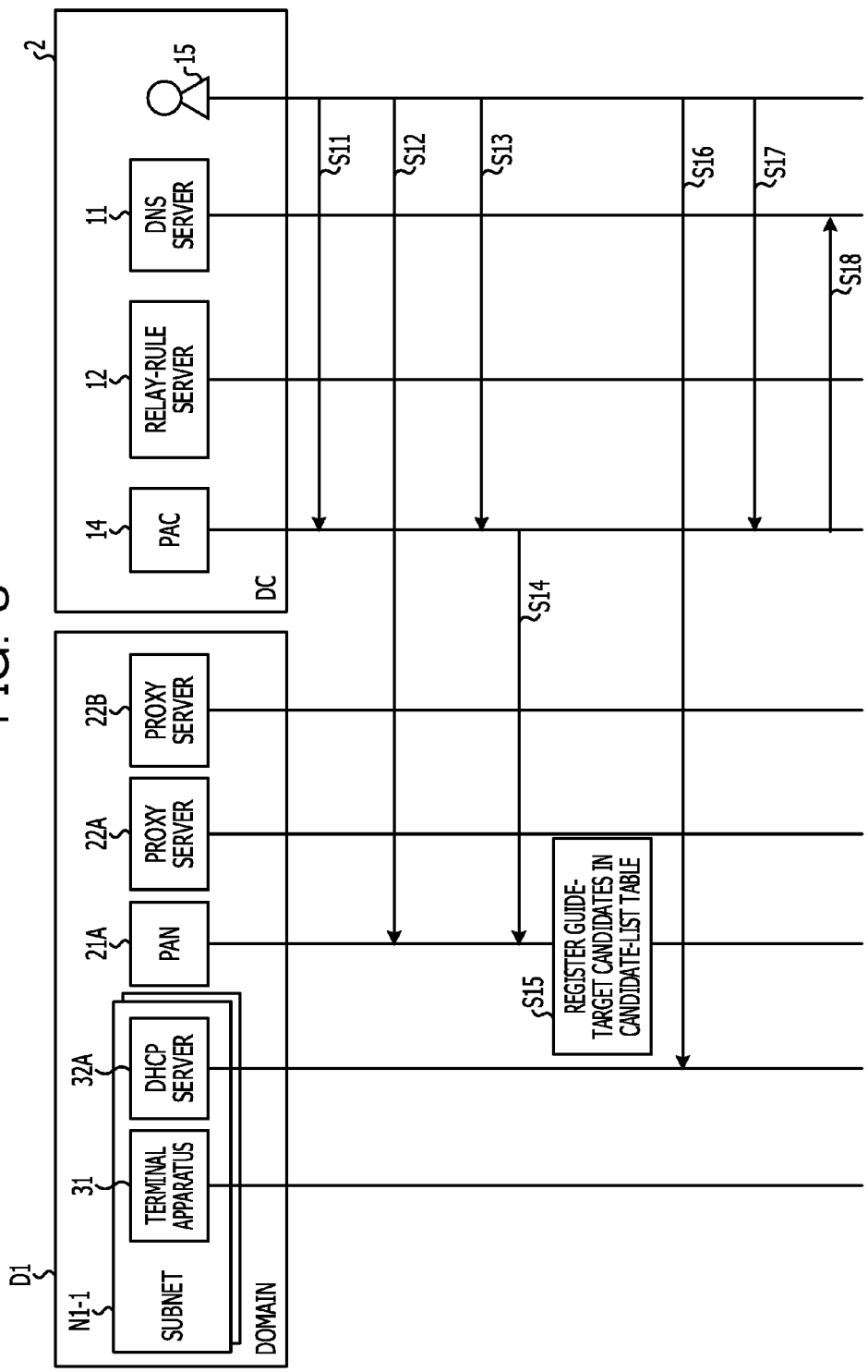
FIG. 8 is a sequence diagram illustrating an example of a processing operation for preparation processing performed in a data providing system according to the first embodiment.

Next, a description will be given on an operation of the data providing system 1 according to the first embodiment. FIG. 8 is a sequence diagram illustrating an example of a processing operation for preparation processing in the data providing system 1 according to the first embodiment. An administrator 15 is, for example, a proxy server administrator in the DC 2. The administrator 15 aggregates, for example, the plurality of subnets N in the domain D1, defines a domain name, and sets the domain name in the PAC 14 (S11). In addition, the administrator 15 further installs the PAN 21A in the domain D1 (S12). The administrator 15 associates the domain D1 with IP addresses of the PAN 21A and the proxy servers 22A and 22B in the domain D1 and registers the associated IP addresses in the PAC 14 (S13).

The PAC 14 sets guide-target candidate setting information in the PAN 21A in the domain D1 (S14). The guide-target candidate setting information is information for presenting the proxy servers 22A and 22B in the domain D1 as guide-target candidates. The PAN 21A registers the guide-target candidate proxy servers 22A and 22B, set by the PAC 14, in the candidate-list table 52 (S15).

The administrator 15 reports DHCP setting information to a DHCP server 32A in the subnet N1-1 (S16). The DHCP setting information is used to instruct the DHCP server 32A so as to set, as the destination (DNS query destination) of a DNS query transmitted from the terminal apparatus 31, the IP address of the PAN 21A in the domain D1 in which the terminal apparatus 31 is located and so as to report the lease information of the IP address to the PAN 21A in the domain D1. The administrator 15 registers, in the PAC 14, the domain name of an access source and the names of the requested-application servers 13 that use the guide-target proxy servers 22A and 22B (S17). Through a contract with the application provider or the like, the administrator 15 sets the domain name of an access source and the names of the requested-application servers 13 that use the proxy servers 22.

The PAC 14 registers, in the DNS server 11, dedicated IP addresses and the names of the requested-application servers 13 that use the guide-target proxy servers 22 (S18). Each dedicated IP address has a tag value indicating the name of the corresponding requested-application server 13 that uses the guide-target proxy server 22. The dedicated IP address is, for example, 1.1.1.1. Since the DNS server 11 centrally manages the names of the requested-application servers 13 (that is, the requested-application-server names) and dedicated IP addresses in association with each other, they may be managed at one location. Each dedicated IP address is also an identifier with which the PAN 21 refers to a response message for a DNS query and determines whether or not the application server 13 uses the guide-target proxy server 22. The dedicated IP address may have, for example, a fixed value common to the entire system. The dedicated IP address may be, for example, the IP address itself of the application server 13 for which the application request to be guided is destined. The dedicated IP address may also be, for example, a server name (for example, appl1.dummy.com) obtained by replacing a requested-application-server name (for example, appl1.aa.com) through use of CNAME function of the DNS.

Although the pre-setting processing on the subnet N1-1 in the domain D1 has been described in the example in FIG. 8, pre-setting processing with similar processing operation is also executed on the subnet N1-2 in the same domain D1 and the subnet N2-1 in the other domain D2.

Figure 9:
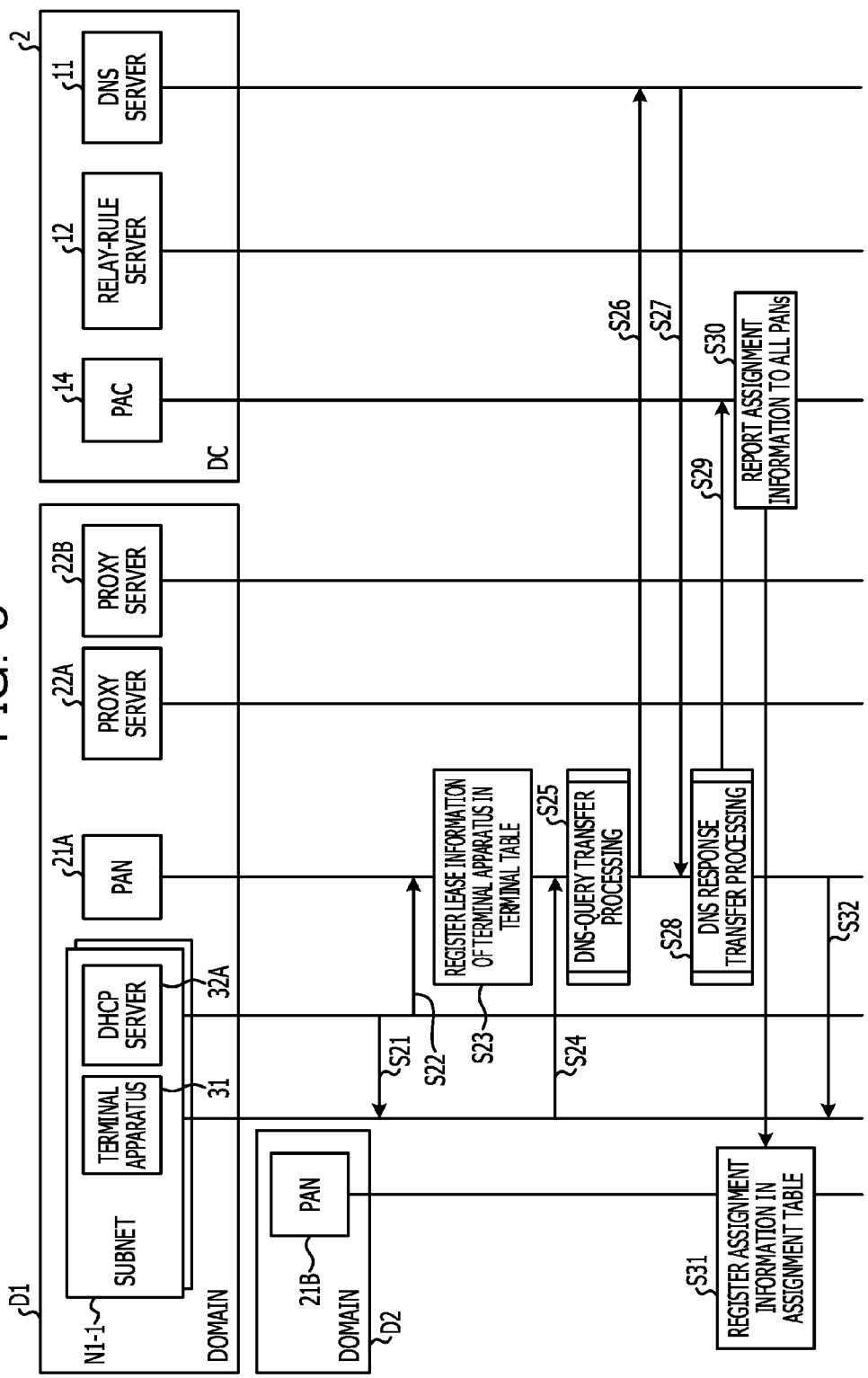
FIG. 9 is a sequence diagram illustrating an example of a processing operation for proxy-server assignment processing performed in a data providing system according to the first embodiment.

FIG. 9 is a sequence diagram illustrating an example of a processing operation for proxy-server assignment processing performed in the data providing system 1 according to the first embodiment. The proxy-server assignment processing illustrated in FIG. 9 is processing in which the guide-target proxy server 22A or 22B for the requested-application server 13 is assigned and the IP address of the already-assigned guide-target proxy server 22 is managed in association with the MAC address of the terminal apparatus 31 and the application server name.

The DHCP server 32A in the subnet N1-1 in the domain D1 illustrated in FIG. 9 reports setting information of the terminal apparatus 31 to the terminal apparatus 31 (S21), when the terminal apparatus 31 is located in the subnet N1-1. The setting information of the terminal apparatus 31 includes the IP address assigned by the DHCP server 32A and the IP address of the PAN 21A that is the DNS query destination transmitted from the terminal apparatus 31. In addition, the DHCP server 32A reports the lease information of the terminal apparatus 31 to the PAN 21A (S22). The lease information includes, for example, the terminal IP address, the terminal MAC address, start time, and end time.

Upon receiving the lease information of the terminal apparatus 31 from the DHCP server 32A, the PAN 21A registers the lease information in the terminal table 51 (S23). Based on the lease information received from the DHCP server 32A, the terminal apparatus 31 transmits a DNS query for an application request to the PAN 21A (S24). The DNS query includes a requested-application-server name, for example, apl1.aa.com.

Figure 10:
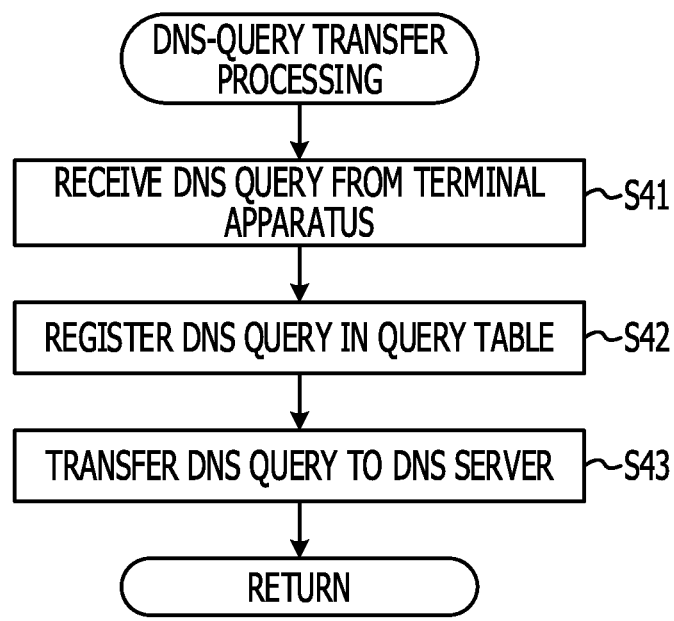
FIG. 10 is a flowchart illustrating an example of a processing operation for DNS-query transfer processing performed by a PAN.

In addition, upon receiving the DNS query for the application request from the terminal apparatus 31, the PAN 21A starts DNS-query transfer processing illustrated in FIG. 10 (S25). By executing the DNS-query transfer processing, the DNS query is transferred to the DNS server 11 (S26).

Upon receiving the DNS query, the DNS server 11 transmits a DNS response corresponding to the DNS query to the PAN 21A (S27). The DNS response includes a dedicated IP address indicating the name of the requested-application server 13 that uses the guide-target proxy server 22.

Upon receiving the DNS response from the DNS server 11, the PAN 21A starts DNS-response transfer processing (described below) illustrated in FIG. 11 (S28). During the DNS-response transfer processing, the PAN 21A reports, to the PAC 14, a distribution request for assignment information including the MAC address of the terminal apparatus 31, the name of the requested-application server 13 to be accessed, and the IP address of the already-assigned guide-target proxy server 22 (S29).

Upon receiving the distribution request for the assignment information, the PAC 14 reports the assignment information to the PAN 21B in another domain D2 (S30). When any domains D other than the domain D2 exist, the PAC 14 also reports the assignment information to all PANs 21 in the other domains D. Upon receiving the assignment information from the PAC 14, the PAN 21B registers the received assignment information in the assignment table 54 (S31). By referring to the assignment table 54, the PAN 21B identifies the MAC address of each terminal apparatus 31, the requested-application-server name, and the IP address of the guide-target proxy server 22A.

By executing the DNS-response transfer processing, a DNS response corresponding to the DNS query transmitted in S24 is transmitted to the terminal apparatus 31 (S32). The DNS response includes, for example, the IP address of the guide-target proxy server 22A for the application request.

Thus, upon receiving the DNS response from the PAN 21A in the domain D1, the terminal apparatus 31 obtains the IP address of the guide-target proxy server 22A, which is included in the DNS response. Based on the IP address of the guide-target proxy server 22A, the terminal apparatus 31 accesses the guide-target proxy server 22A to obtain a requested application therefrom.

FIG. 10 is a flowchart illustrating an example of a processing operation for the DNS-query transfer processing performed by the PAN 21A. In FIG. 10, upon receiving a DNS query from the terminal apparatus 31 (S41), the PAN 21A registers the query information, included in the DNS query, in the query table 53 (S42). The query information includes the transmission-source IP address in the DNS query and the inquiry ID in the pre-transfer query information. The PAN 21A transfers the DNS query, received from the terminal apparatus 31, to the DNS server 11 (S43) and ends the processing operation illustrated in FIG. 10.

Upon receiving the DNS query from the terminal apparatus 31, the PAN 21A that performs the DNS-query transfer processing illustrated in FIG. 10 may transfer the DNS query to the DNS server 11, based on the inquiry IDs in the DNS queries before and after the transfer.

Figure 11:
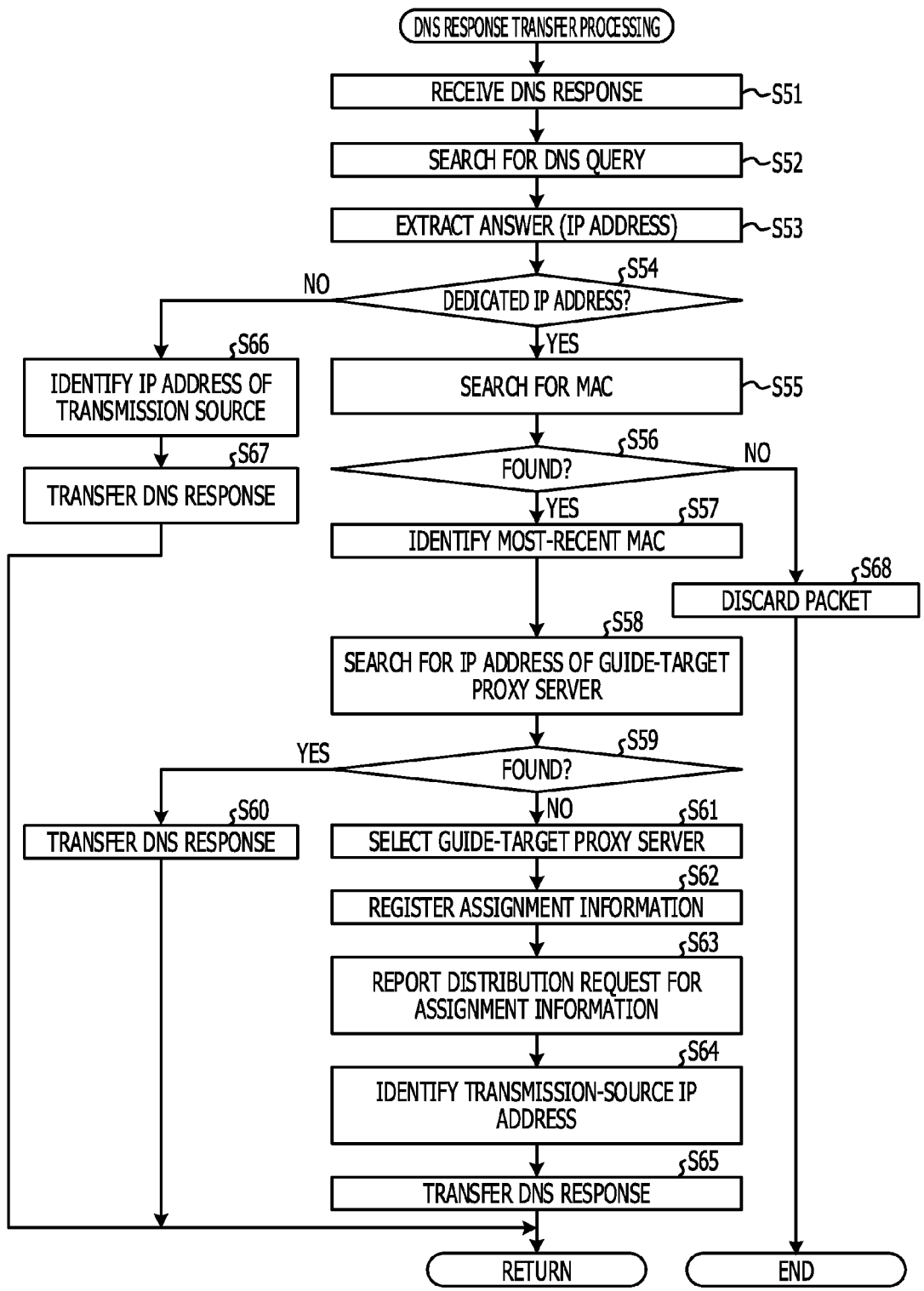
FIG. 11 is a flowchart illustrating an example of a processing operation for DNS-response transfer processing performed by a PAN.

FIG. 11 is a flowchart illustrating an example of processing operation for the DNS-response transfer processing performed by the PAN 21A. The DNS-response transfer processing illustrated in FIG. 11 is processing in which the PAN 21A transfers, upon receiving a DNS response to an application request from the DNS server 11, the IP address of the already-assigned guide-target proxy server 22 to the terminal apparatus 31 as a DNS response. The IP address corresponds to the MAC address of the terminal apparatus 31 and the requested-application-server name.

In FIG. 11, upon receiving a DNS response from the DNS server 11 (S51), the PAN 21A searches for a DNS query corresponding to the DNS response (S52). The PAN 21A searches for an IP address in the answer resource record 71H in the DNS response (S53). The PAN 21A determines whether or not the IP address in the answer resource record 71H is a dedicated IP address (S54). When the IP address in the answer resource record 71H is a dedicated IP address (YES in S54), the PAN 21A determines that the application request is an application request that uses the guide-target proxy server 22. In addition, the PAN 21A refers to the terminal table 51 to search for the MAC address of the terminal apparatus 31 corresponding to the transmission-source IP address in the DNS query (S55).

The PAN 21A determines whether or not any MAC address corresponding to the transmission-source IP address is found (S56). When any MAC address corresponding to the transmission-source IP address is found (YES in S56), the PAN 21A refers to the terminal table 51 to identify, from among the found MAC addresses of the terminal apparatuses 31, the MAC address having a most-recent start time (S57). The reason why the MAC address having the most-recent start time is identified is that, an IP address assigned to the terminal apparatus 31 may remain in the terminal table 51 after the end time passes, and thus, when a plurality of same IP addresses remain in the terminal table 51, the IP address having the most-recent start time is used to identify the correct MAC address of the terminal apparatus 31 for the DNS query.

The PAN 21A refers to the assignment table 54 to search for the IP address of the already-assigned guide-target proxy server 22 corresponding to the identified MAC address of the terminal apparatus 31 and the requested-application-server name (S58). The PAN 21A determines whether or not the IP address of the already-assigned guide-target proxy server 22 is found (S59).

When the IP address of the already-assigned guide-target proxy server 22 is found (YES in S59), the PAN 21A attaches the found IP address of the guide-target proxy server 22 to a DNS response and transfers the resulting DNS response to the terminal apparatus 31 (S60). The PAN 21A then ends the processing operation illustrated in FIG. 11.

When the IP address of the already-assigned guide-target proxy server 22 is not found (NO in S59), the PAN 21A selects an optimum one of the guide-target proxy servers 22, from among proxy ID 52A in the candidate-list table 52 (S61). In the selection of the optimum guide-target proxy server 22, the PAN 21A selects, from among the proxy servers 22 in the candidate-list table 52, the guide-target proxy server 22 in which the amount of CPU load and the amount of cache used are optimum, for example, smallest.

The PAN 21A registers, in the assignment table 54, assignment information in which the IP address of the selected guide-target proxy server 22 is associated with the MAC address of the terminal apparatus 31 and the name of the application server 13 for which the application request has been issued (S62). Upon registering the assignment information in the assignment table 54, the PAN 21A reports, to the PAC 14, a distribution request for distributing the assignment information to the PANs 21 in the domains D other than the domain D of the PAN 21A (S63).

In addition, the PAN 21A refers to the query table 53 to identify a transmission-source IP address in a DNS query corresponding to the DNS response (S64). Based on the transmission-source IP address, the PAN 21A identifies the terminal apparatus 31 that is a destination (DNS response destination) of the DNS response and is a source (DNS query source) of the DNS query. Based on the identified transmission-source IP address, the PAN 21A transfers a DNS response including the IP address of the guide-target proxy server 22 to the terminal apparatus 31 (S65), and then ends the processing operation illustrated in FIG. 11.

When the IP address in the answer resource record 71H in the DNS response is not a dedicated IP address (NO in S54), the PAN 21A refers to the query table 53 to identify the IP address of the DNS query source (S66). The PAN 21A transfers the DNS response to the terminal apparatus 31 corresponding to the IP address of the DNS query source (S67), and then ends the processing operation illustrated in FIG. 11.

When the MAC address of the terminal apparatus 31 is not found (NO in S56), the PAN 21A discards the packet of the DNS response (S68), and then ends the processing operation illustrated in FIG. 11.

When the IP address in the DNS response received from the DNS server 11 is a dedicated IP address, the PAN 21A that performs the DNS-response transfer processing illustrated in FIG. 11 may determine that the application request has been made by the terminal apparatus 31 via the guide-target proxy server 22. Thus, based on the dedicated IP address in the DNS response, the PAN 21A may determine the terminal apparatus 31 that has been made the application request via the guide-target proxy server 22.

By referring to the terminal table 51, the PAN 21A identifies a MAC address corresponding to the transmission-source IP address in the DNS query corresponding to the DNS response. Thus, by using the terminal MAC address corresponding to the transmission-source IP address in the DNS query corresponding to the DNS response, the PAN 21A may identify the terminal apparatus 31 that has issued the application request.

The PAN 21A refers to the assignment table 54 to identify the already-assigned guide-target proxy server 22 corresponding to the terminal MAC address and the requested-application-server name, attaches the IP address of the guide-target proxy server 22 to a DNS response, and transfers the resulting DNS response to the terminal apparatus 31. As a result, the PAN 21A may ensure that cache data related to the same application requested by the same terminal apparatus 31 is not redundantly registered in the plurality of guide-target proxy servers 22.

When the PAN 21A refers to the assignment table 54 and the already-assigned guide-target proxy server 22 corresponding to the terminal MAC address and the requested-application-server name does not exist, the PAN 21A selects a guide-target proxy server 22 from the proxy servers 22 in the candidate-list table 52. In this case, the PAN 21A selects the guide-target proxy server 22, based on the amount of CPU load of each proxy servers 22 and the amount of cache used thereby. As a result, the PAN 21A may select an optimum one of the guide-target proxy servers 22 from the candidate-list table 52.

In addition, when new assignment information is registered in the assignment table 54, the PAN 21A reports a distribution request for the assignment information to the PAC 14. Upon receiving the distribution request for the assignment information, the PAC 14 reports the assignment information to the PANs 21 in other domains D. As a result, most-recent assignment information is registered in the assignment table 54 in each PAN 21. Thus, even when the terminal apparatus 31 moves from one domain D to another, each PAN 21 may ensure that cache data related to the same application requested by the same terminal apparatus 31 is not redundantly registered in the plurality of guide-target proxy servers 22.

Next, a description will be given on an operation when the terminal apparatus 31 obtains cache data of an application from the guide-target proxy server 22A.

Upon receiving a DNS response including the IP address of the guide-target proxy server 22A to be requested from the PAN 21A, the terminal apparatus 31 accesses the guide-target proxy server 22A, based on the IP address. The guide-target proxy server 22A identifies the terminal ID in the authentication header received from the terminal apparatus 31. The terminal ID is, for example, an apparatus ID, a user ID, or the like of the terminal apparatus 31.

When no authentication header exists, the guide-target proxy server 22A issues a request for a user ID and a password to the terminal apparatus 31. The guide-target proxy server 22A then authenticates the terminal apparatus 31 by using the user ID and the password received from the terminal apparatus 31 and reports an authentication header to the terminal apparatus 31. Thus, the authentication header including the terminal ID is attached to a message subsequently issued from the terminal apparatus 31.

The guide-target proxy server 22A then searches for content data corresponding to the terminal ID and the requested application. When the content data is not found during the search, the guide-target proxy server 22A obtains, from the relay-rule server 12, an access control rule and a transfer control rule corresponding to the terminal ID and a URL (access-destination URL) to be accessed. The guide-target proxy server 22A transfers a message to the application server 13 corresponding to the access-destination URL and receives a response message accompanying the content data from the application server 13. As a result, the guide-target proxy server 22A, for example, associates the content data, the access control rule, and the transfer control rule with the user ID and the access-destination URL and caches the associated information.

When the content data is found during the search, the guide-target proxy server 22A does not transfer the message to the application server 13 and transmits the content data as a response to the DNS query from the terminal apparatus 31. As a result, the terminal apparatus 31 may obtain the content data of the application from the guide-target proxy server 22A.

Figure 12:
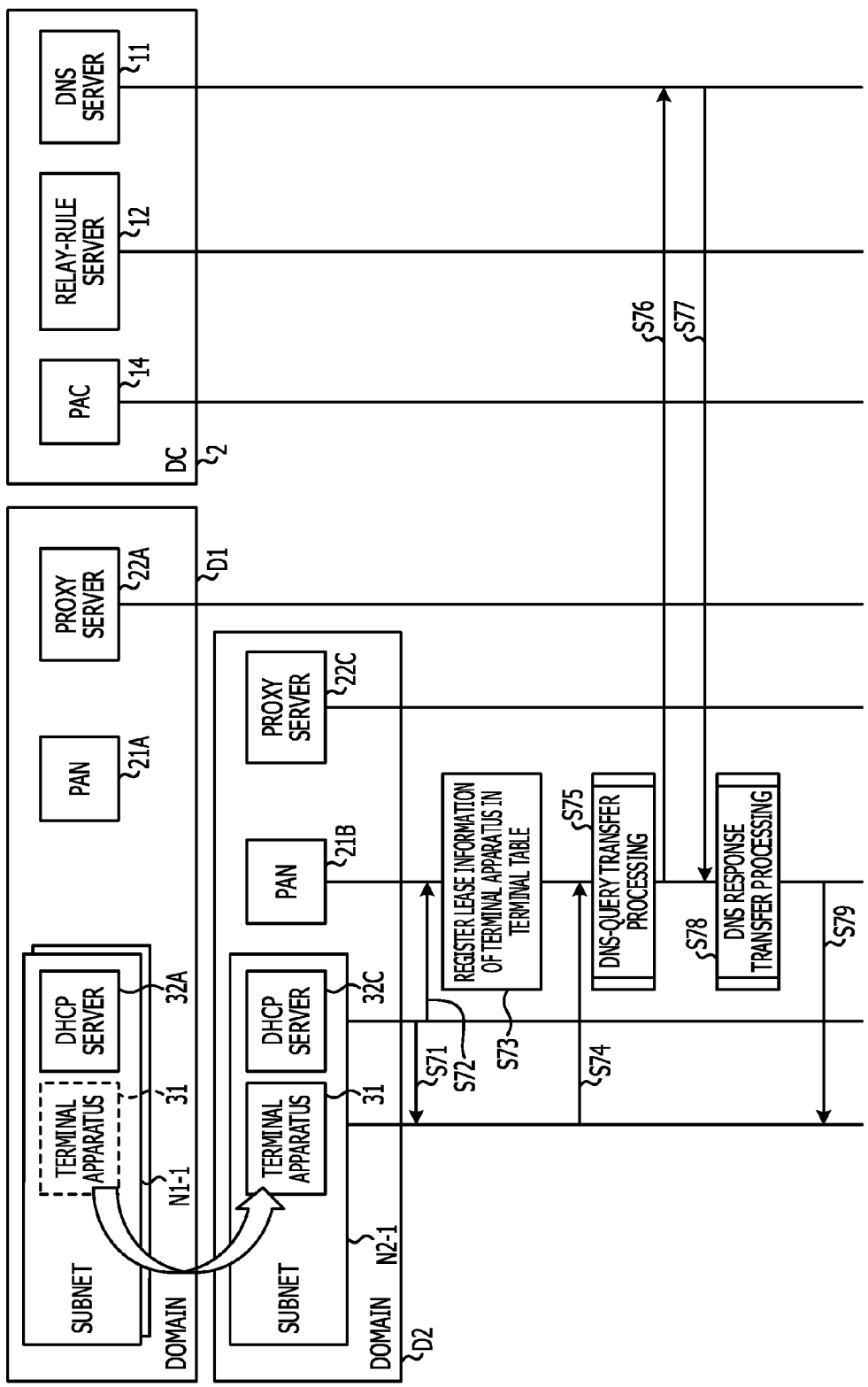
FIG. 12 is a sequence diagram illustrating an example of a processing operation for DNS-response transfer processing when a terminal apparatus is moved.

FIG. 12 is a sequence diagram illustrating an example of a processing operation for DNS-response transfer processing when the terminal apparatus 31 is moved. FIG. 12 illustrates a case in which the terminal apparatus 31 is moved from the subnet N1-1 in the domain D1 to the subnet N2-1 in the domain D2. In FIG. 12, when the terminal apparatus 31 is located in the subnet N2-1 to which it has moved, a DHCP server 32C in the subnet N2-1 in the domain D2 reports the setting information of the terminal apparatus 31 to the terminal apparatus 31 (S71). The setting information is assumed to include, in addition to the IP address assigned to the terminal apparatus 31, the IP address of the PAN 21B that is a DNS query destination of the terminal apparatus 31. In addition, the DHCP server 32C reports the lease information of the terminal apparatus 31 to the PAN 21B (S72). The lease information includes the IP address of the terminal apparatus 31, the MAC address of the terminal apparatus 31, the start time, the end time, and so on.

Upon receiving the lease information of the terminal apparatus 31 from the DHCP server 32C, the PAN 21B stores the lease information in the terminal table 51 (S73). Based on the setting information received from the DHCP server 32C, the terminal apparatus 31 transmits a DNS query for an application request to the PAN 21B (S74). The DNS query is assumed to include the name of the requested-application server 13 to be accessed, for example, apl1.aa.com.

In addition, upon receiving the DNS query from the terminal apparatus 31, the PAN 21B starts the DNS-query transfer processing illustrated in FIG. 10 (S75). By executing the DNS transfer processing, the DNS query is transferred to the DNS server 11 (S76).

Upon receiving the DNS query, the DNS server 11 transmits a DNS response to the DNS query to the PAN 21B (S77). The DNS response includes a dedicated IP address corresponding to the name of the requested-application server 13 that uses the guide-target proxy server 22.

Upon receiving the DNS response, the PAN 21B starts the DNS-response transfer processing illustrated in FIG. 11 (S78). By executing the DNS-response transfer processing, a DNS response to the DNS query transmitted in S74 is transferred to the terminal apparatus 31 (S79). The DNS response includes the IP address of the guide-target proxy server 22A for the application request. As a result, upon receiving a DNS response from the PAN 21B in the domain D2, the terminal apparatus 31 accesses the guide-target proxy server 22, based on the IP address of the already-assigned guide-target proxy server 22A. The IP address is included in the DNS response. The terminal apparatus 31 then obtains the requested application from the guide-target proxy server 22. That is, the terminal apparatus 31 accesses the requested-application server 13 by using the assigned proxy server 22A in the domain D1, rather than using a proxy server 22C in the domain D2 in which the terminal apparatus 31 is located.

Figure 13:
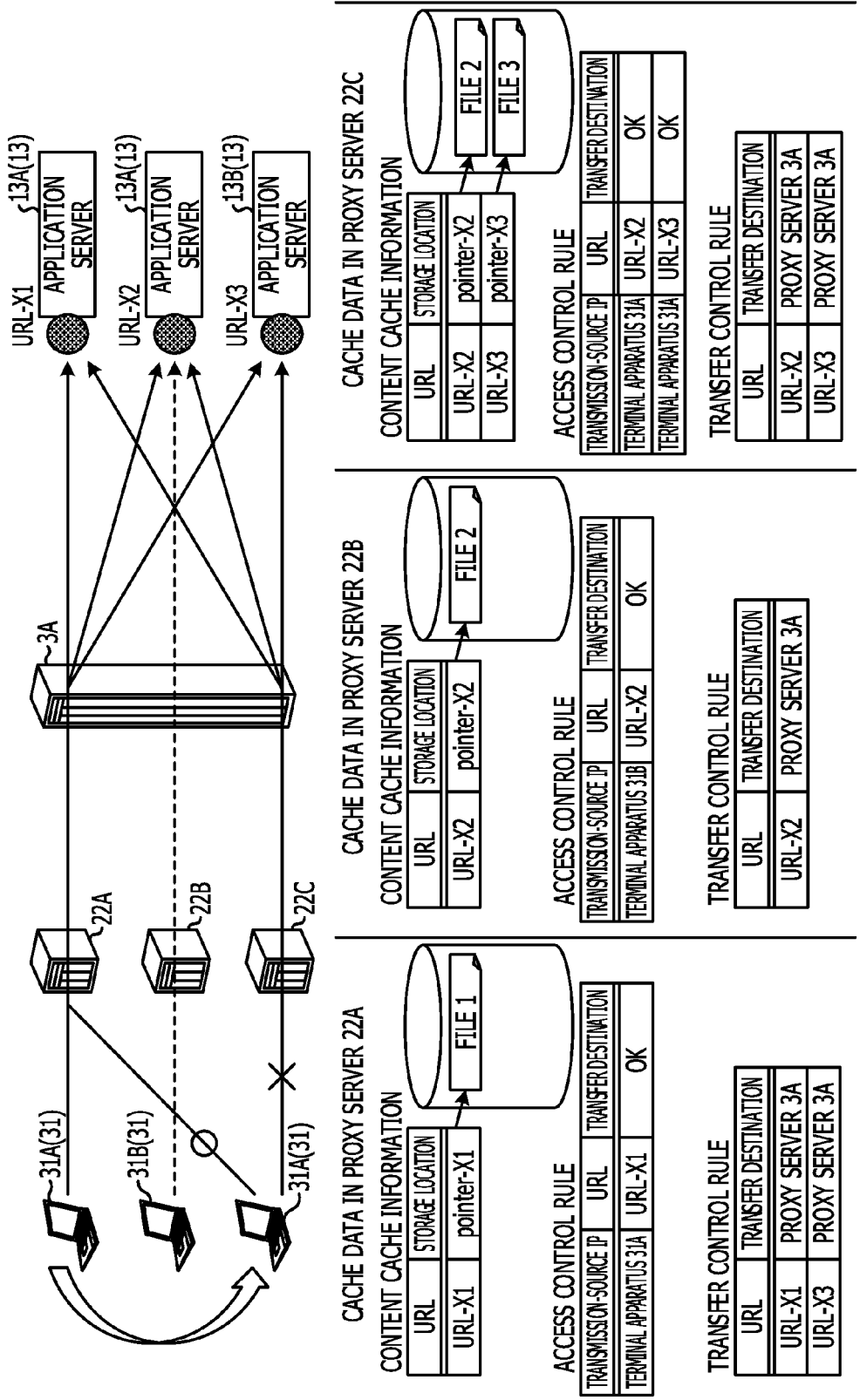
FIG. 13 illustrates an example of cache states of proxy servers in a data providing system according to the first embodiment.

FIG. 13 illustrates an example of cache states of the proxy servers 22 in the data providing system 1 according to the first embodiment. A terminal apparatus 31A in the domain D1 is assumed to use the guide-target proxy server 22A corresponding to the application server 13A at URL-X1. URL-X1 is a URL of the application server 13A to be accessed by the terminal apparatus 31A. A terminal apparatus 31B in the domain D1 is assumed to use the guide-target proxy server 22B corresponding to the application server 13A at URL-X2. URL-X2 is a URL of the application server 13A to be accessed by the terminal apparatus 31B. In addition, it is assumed that the terminal apparatus 31A has moved from the domain D1 to the domain D2.

Cache data in the proxy server 22A in the domain D1 includes, as content cache information, the URL and a storage location regarding the application server 13A at URL-X1 to be accessed. In addition, the cache data in the proxy server 22A includes, as access control rules, the transmission-source IP address of the terminal apparatus 31A, the URL, and transfer-destination availability, to permit access from the terminal apparatus 31A. In addition, the cache data in the proxy server 22A includes, as a transfer control rule, the proxy server 3A that serves as the transfer destination of the application server 13A at URL-X1 and the application server 13B at URL-X3 to permit transfer of access from the terminal apparatus 31A.

Cache data in the proxy server 22B in the domain D1 includes, as content cache information, the URL and a storage location regarding the application server 13A at URL-X2 to be accessed. In addition, the cache data in the proxy server 22B includes, as access control rules, the transmission-source IP address of the terminal apparatus 31B, the URL, and transfer-destination availability, to permit access from the terminal apparatus 31B. In addition, the cache data in the proxy server 22B includes, as a transfer control rule, the proxy server 3A that serves as the transfer destination of the application server 13A at URL-X2 to permit transfer of access from the terminal apparatus 31B.

Cache data in the proxy server 22C in the domain D2 includes, as content cache information, the URLs and storage locations regarding the application server 13A at URL-X2 and the application server 13B at URL-X3 to be accessed. In addition, the cache data in the proxy server 22C includes, as access control rules, the transmission-source IP address of the terminal apparatus 31A, the URLs, and transfer-destination availability to permit access from the terminal apparatus 31A. In addition, the cache data in the proxy server 22C includes, as a transfer control rule, the proxy server 3A that serves as the transfer destination of the application server 13A at URL-X2 and the application server 13B at URL-X3 to permit transfer of access from the terminal apparatus 31A.

That is, when the guide-target proxy server 22A for the application request to URL-X1 is already assigned, the terminal apparatus 31A accesses the guide-target proxy server 22A without using the proxy server 22C in the domain D2 even if the terminal apparatus 31A moves from the domain D1 to the domain D2. As a result, since cache data related to the application request to URL-X1 are aggregated in the guide-target proxy server 22A, it is possible to ensure that the cache data are not redundantly registered in the plurality of proxy servers 22.

Upon detecting an application request transmitted from the terminal apparatus 31, the PAN 21 according to the first embodiment determines whether or not there is the IP address of the already-assigned guide-target proxy server 22 corresponding to the terminal MAC address of the terminal apparatus 31 and an application server name requested by the terminal apparatus 31. When there is the IP address of the already-assigned guide-target proxy server 22, the PAN 21 attaches the IP address of the already-assigned guide-target proxy server 22 to a DNS response and transfers the resulting DNS response to the terminal apparatus 31 that has issued the application request. As a result, the terminal apparatus 31 may obtain the IP address of the already-assigned guide-target proxy server 22 corresponding to the terminal MAC address of the terminal apparatus 31 and the application server name.

By using the terminal MAC and the application server name, the PAN 21 manages the already-assigned guide-target proxy server 22 in the assignment table 54. As a result, the PAN 21 may ensure that, even when the terminal apparatus 31 moves from one domain D to another, cache data related to the same terminal apparatus 31 and the same application is not redundantly registered in the guide-target proxy servers 22. Furthermore, since no redundant registration of cache data is ensured, it is possible to save or reduce the finite cache capacity of the proxy server 22.

When the PAN 21 refers to the assignment table 54 and determines that there is no IP address of the already-assigned guide-target proxy server 22 corresponding to the application server name and the terminal MAC address of the terminal apparatus 31 that has issued the application request, the PAN 21 selects an optimum one of the guide-target proxy servers 22 from the candidate-list table 52. As a result, the PAN 21 may assign the optimum guide-target proxy server 22 to the terminal apparatus 31.

During the above-described selection of the optimum guide-target proxy server 22, the PAN 21 selects, from the candidate-list table 52, a guide-target proxy server 22 in which the amount of CPU load and the amount of cache are the smallest. As a result, the PAN 21 may equalize the loads of the proxy servers 22 to inhibit imbalance.

When the MAC address of the terminal apparatus 31 that has issued the application request, the application server name, and the IP address of the already-assigned guide-target proxy server 22 are stored in the assignment table 54 as assignment information, the PAN 21 issues a distribution request for the assignment information to the PAC 14 that manages the PANs 21. In response to the distribution request, the PAC 14 distributes the assignment information to the PANs 21. Upon receiving the assignment information, the PANs 21 store the assignment information in the respective assignment tables 54. As a result, since the contents of the assignment tables 54 in the PANs 21 become equal to each other, it is possible to ensure that cache data related to the same application requested by the same terminal apparatus 31 is not redundantly registered in the guide-target proxy servers 22.

Upon receiving the IP address and the MAC address of the terminal apparatus 31 from the DHCP server 32 that assigns IP addresses to respective terminal apparatuses 31 in the same subnet N, the PAN 21 stores the IP address and the MAC address of the terminal apparatus 31 in the terminal table 51. As a result, the PAN 21 may identify the terminal apparatus 31 by using not only the IP address but also the MAC address.

The DNS server 11 centrally manages, for each application request, a dedicated IP address indicating that the application request obtains an application via the guide-target proxy server 22. The PAN 21 receives a dedicated IP address from the DNS server 11 as a response result for an application request from the terminal apparatus 31, and based on the presence/absence of a dedicated IP address, the PAN 21 determines whether or not the application request transmitted from the terminal apparatus 31 is an application request that uses the guide-target proxy server 22. The PAN 21 may identify an application request for the guide-target proxy server 22 by using the dedicated IP address in a DNS response received from the DNS server 11.

In the data providing system 1, cache data corresponding to the MAC address of the terminal apparatus 31 and the name of the application server to be accessed are aggregated in a single guide-target proxy server 22, regardless of movement of the terminal apparatus 31 from one domain D to another. As a result, it is possible to ensure that cache data is not redundantly registered in the proxy servers 22, and it is also possible to ensure that the amounts of cache data in the proxy servers 22 do not become unbalanced.

In the first embodiment, the DNS server 11 centrally manages the requested-application-server name and the dedicated IP address in association with each other. The PAN 21 receives the DNS response including the dedicated IP address from the DNS server 11 and determines, based on the dedicated IP address, that the application request uses the guide-target proxy server 22. However, the PAN 21 in each domain D may manage application server names for identifying application requests that use the guide-target proxy server 22. A second embodiment will be described below as an embodiment in such a case. Elements that are the same as or similar to those in the data providing system 1 in the first embodiment are denoted by the same reference numerals, and descriptions of redundant elements and operations are not given hereinafter.

Second Embodiment

Figure 14:
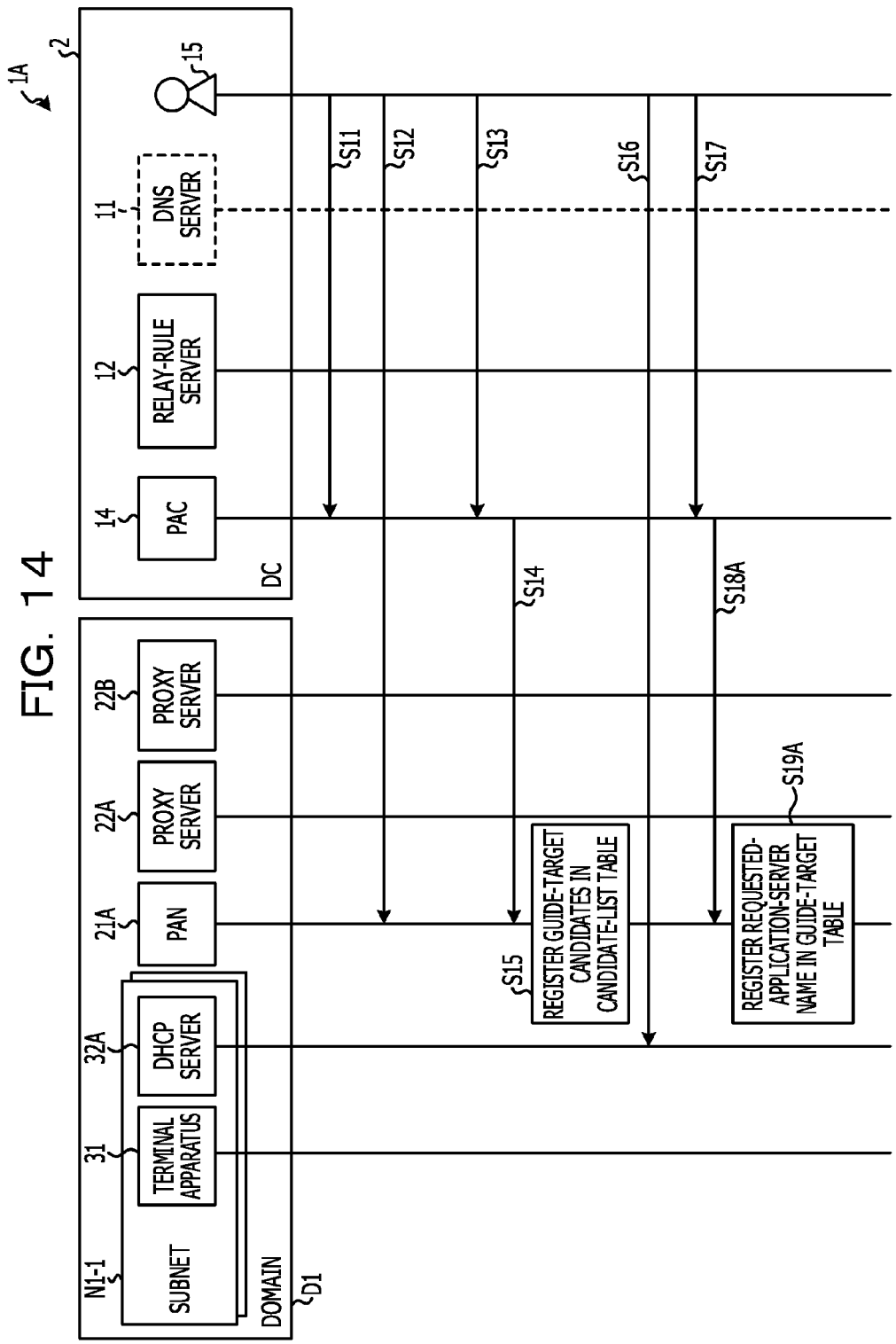
FIG. 14 is a sequence diagram illustrating an example of a processing operation for preparation processing performed in a data providing system according to a second embodiment.

FIG. 14 is a sequence diagram illustrating an example of a processing operation for preparation processing in a data providing system according to the second embodiment. Each PAN 21 in each domain D registers the requested-application-server names in a guide-target table (not illustrated). The guide-target table manages the requested-application-server name. After the administrator 15 in a data providing system 1A in FIG. 14 registers the requested-application-server names that use the guide-target proxy server 22 in the PAC 14 in S17, the PAC 14 reports the requested-application-server names to the PANs 21 in each domain D (S18A). Each PAN 21 in each domain D registers the requested-application-server names in the guide-target table (S19A) and ends the processing operation illustrated in FIG. 14.

Figure 15:
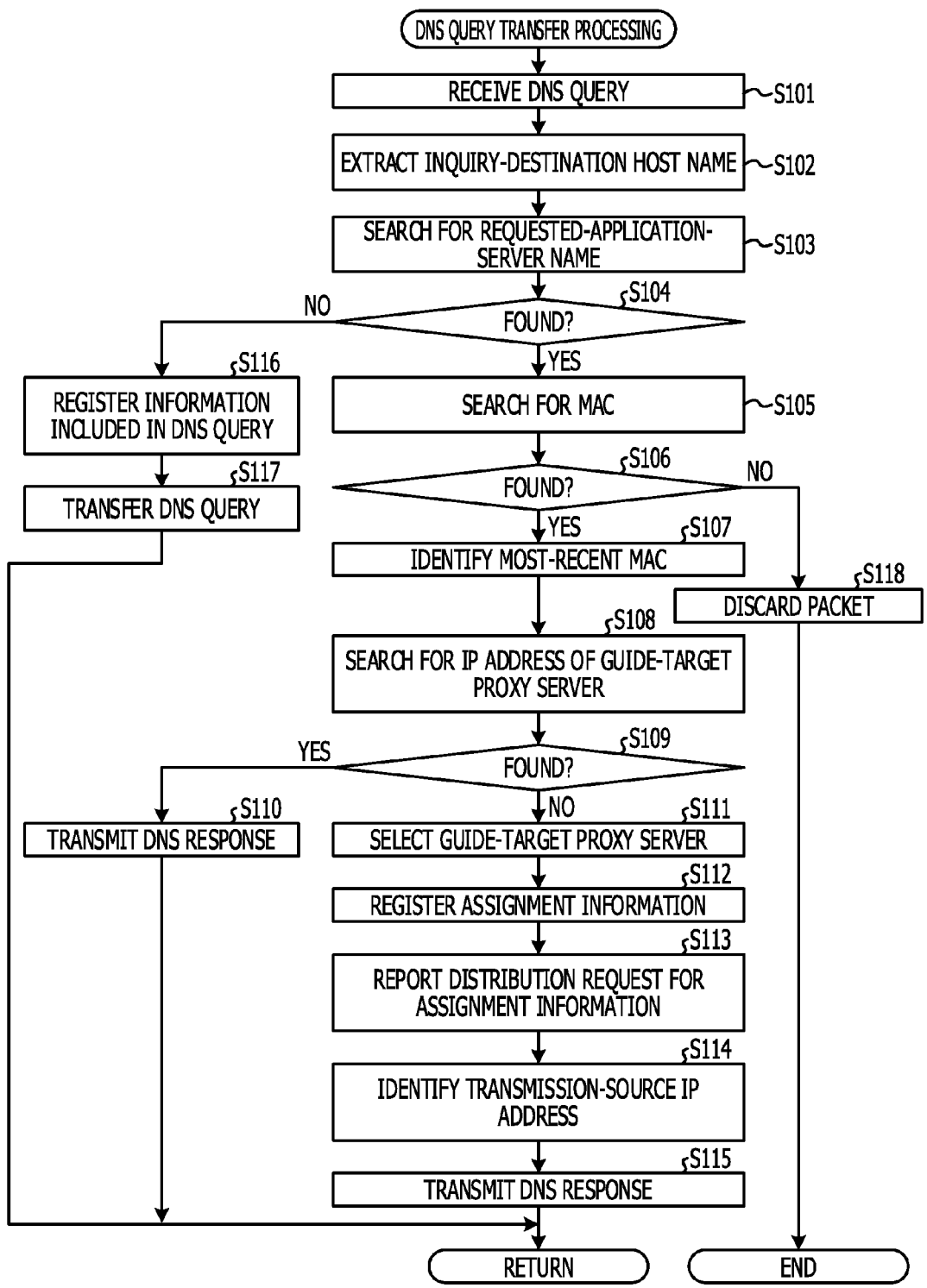
FIG. 15 is a flowchart illustrating an example of a processing operation for DNS-query transfer processing performed by a PAN.

FIG. 15 is a flowchart illustrating an example of a processing operation for the DNS-query transfer processing performed by the PAN 21A. The DNS-query transfer processing is processing in which, when a DNS query for an application request is received, a DNS response to which the IP address of the already-assigned guide-target proxy server 22 which corresponds to the MAC address of the terminal apparatus 31 and the requested-application-server name is attached is transferred to the terminal apparatus 31.

In FIG. 15, upon receiving a DNS query from the terminal apparatus 31 (S101), the PAN 21A extracts an inquiry-destination host name stored in the question section 71G in the DNS query (S102). The PAN 21A searches the guide-target table for a requested-application-server name that matches the extracted inquiry-destination host name (S103).

The PAN 21A determines whether or not a requested-application-server name is found (S104). When a requested-application-server name is found (YES in S104), the PAN 21A refers to the terminal table 51 to search for the MAC address of the terminal apparatus 31 corresponding to the transmission-source IP address in the DNS query (S105).

The PAN 21A determines whether or not there is any MAC address that matches the MAC address of the terminal apparatus 31 (S106). By referring to the terminal table 51, the PAN 21A identifies, from among found MAC addresses that match the MAC address of the terminal apparatus 31, the MAC address having a most-recent start time (S107).

By referring to the assignment table 54, the PAN 21A searches for the IP address of the already-assigned guide-target proxy server 22 corresponding to the identified MAC address of the terminal apparatus 31 and the requested-application-server name (S108). The PAN 21A determines whether or not the IP address of the assigned proxy server 22 is found (S109).

When the IP address of the already-assigned guide-target proxy server 22 is found (YES in S109), the PAN 21A attaches the found IP address of the guide-target proxy server 22 to a DNS response and transmits the resulting DNS response to the terminal apparatus 31 (S110). Thereafter, the PAN 21A ends the processing operation illustrated in FIG. 15.

When the IP address of the already-assigned guide-target proxy server 22 is not found (NO in S109, the PAN 21A selects an optimum one of the guide-target proxy servers 22 from the candidate-list table 52 (5111). In the selection of the optimum guide-target proxy server 22, the PAN 21A selects, from the candidate-list table 52, the proxy server 22 in which the amount of CPU load and the amount of cache used are optimum, for example, smallest.

The PAN 21A registers, in the assignment table 54, assignment information in which the IP address of the selected guide-target proxy server 22 is associated with the MAC address of the terminal apparatus 31 and the application server name for which the application request has been issued (S112). Upon registering the assignment information in the assignment table 54, the PAN 21A reports, to the PAC 14, a distribution request for distributing the assignment information to the PANs 21 in the domains D other than the domain D of the PAN 21A (S113).

In addition, the PAN 21A refers to the query table 53 to identify a transmission-source IP address in a DNS query corresponding to the DNS response (S114). Based on the identified transmission-source IP address, the PAN 21A identifies the terminal apparatus 31 that is the DNS query source. Based on the identified transmission-source IP address, the PAN 21A transmits a DNS response including the IP address of the guide-target proxy server 22 to the terminal apparatus 31 (S115). Thereafter, the PAN 21A ends the processing operation illustrated in FIG. 15.

When the requested-application-server name is not found (NO in S104), the PAN 21A registers the information, included in the DNS query, in the query table 53 (S116). The PAN 21A transfers the DNS query to the DNS server 11 (S117) and then ends the processing operation illustrated in FIG. 15.

When the MAC address of the terminal apparatus 31 is not found (NO in S106), the PAN 21A discards the packet of the DNS query (S118) and then ends the processing operation illustrated in FIG. 15.

The PAN 21A that performs the DNS-response transfer processing illustrated in FIG. 15 receives a DNS query from the terminal apparatus 31, and determines that, when the inquiry-destination host name in the DNS query is the requested-application-server name in the guide-target table, the application request transmitted from the terminal apparatus 31 is to be made via the guide-target proxy server 22. Thus, by referring to the guide-target table, the PAN 21A may determine that the DNS query transmitted from the terminal apparatus 31 is to be made via the guide-target proxy server 22. Therefore, the PAN 21A may determine that the application request is for the guide-target proxy server 22, without querying the DNS server 11. As a result, the response speed is increased.

By referring to the terminal table 51, the PAN 21A identifies a MAC address corresponding to the transmission-source IP address in the DNS query. Thus, by using a terminal MAC address corresponding to the transmission-source IP address in the DNS query, the PAN 21A may identify the terminal apparatus 31 that has issued the application request.

The PAN 21A refers to the assignment table 54 to identify the already-assigned guide-target proxy server 22 corresponding to the terminal MAC address and the requested-application-server name, attaches the IP address of the guide-target proxy server 22 to a DNS response, and transmits the resulting DNS response to the terminal apparatus 31. As a result, the PAN 21A may ensure that cache data related to the same application requested by the same terminal apparatus 31 is not redundantly registered in the plurality of guide-target proxy servers 22.

When the PAN 21A refers to the assignment table 54 and the already-assigned guide-target proxy server 22 corresponding to the terminal MAC address and the requested-application-server name does not exist, the PAN 21A selects a guide-target proxy server 22 from the proxy servers 22 in the candidate-list table 52. In this case, the PAN 21A selects the guide-target proxy server 22, based on the amount of CPU load of each proxy server 22 and the amount of cache used thereby. As a result, the PAN 21A may select an optimum one of the guide-target proxy servers 22 from the candidate-list table 52.

In addition, when new assignment information is registered in the assignment table 54, the PAN 21A reports a distribution request for the assignment information to the PAC 14. Upon receiving the distribution request for the assignment information, the PAC 14 distributes the assignment information to PANs 21 in other domains D. Upon receiving the assignment information, PANs 21 register the received assignment information in the respective assignment tables 54. As a result, the most-recent assignment information is registered in the assignment table 54 in each PAN 21. Thus, even when the terminal apparatus 31 moves from one domain D to another, each PAN 21 may ensure that cache data is not redundantly registered in the plurality of guide-target proxy servers 22.

Figure 16:
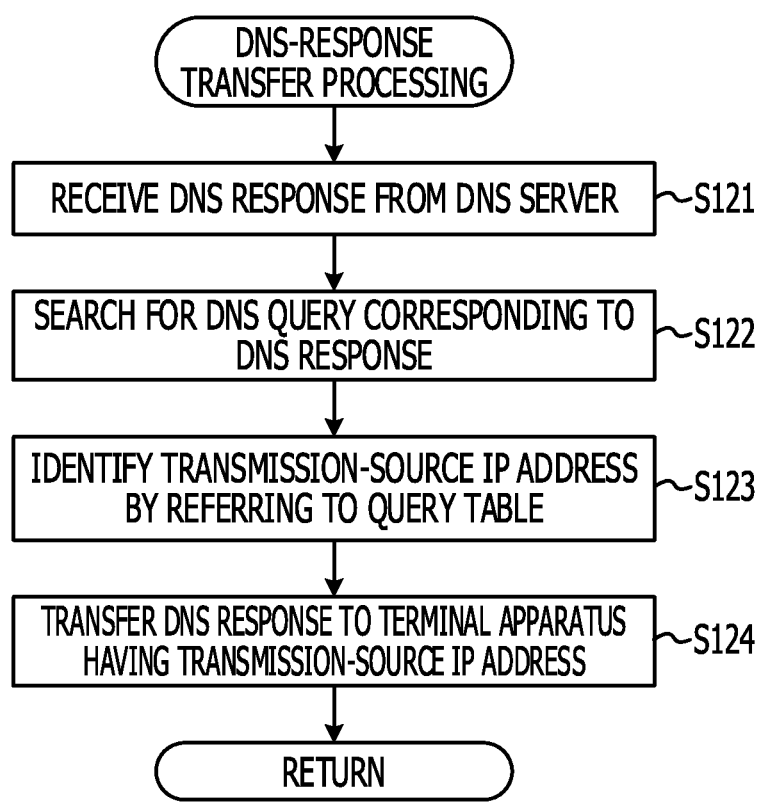
FIG. 16 is a flowchart illustrating an example of a processing operation for DNS-response transfer processing performed by a PAN.

FIG. 16 is a flowchart illustrating an example of a processing operation for the DNS-response transfer processing performed by the PAN 21A. The DNS-response transfer processing illustrated in FIG. 16 is processing in which the PAN 21A transfers a DNS response to a DNS query to the terminal apparatus 31. The DNS response has been transmitted from the DNS server 11.

In FIG. 16, upon receiving a DNS response from the DNS server 11 (S121), the PAN 21A refers to the query table 53 to search for a DNS query corresponding to the DNS response (S122). By referring to the query table 53, the PAN 21A identifies a transmission-source IP address in the DNS query (S123). The PAN 21A transfers the DNS response, which has been received from the DNS server 11, to the terminal apparatus 31 having the transmission-source IP address (S124) and then ends the processing operation illustrated in FIG. 16.

The PAN 21 in the second embodiment has a guide-target table for managing requested-application-server names to identify whether or not each application request uses the guide-target proxy server 22. Upon receiving an application request from the terminal apparatus 31, the PAN 21 refers to the guide-target table to determine whether or not the application request transmitted from the terminal apparatus 31 uses the guide-target proxy server 22. Thus, without transferring a DNS query received from the terminal apparatus 31 to the DNS server 11, the PAN 21 may determine whether or not an application request transmitted from the terminal apparatus 31 uses the guide-target proxy server 22. This makes it possible to enhance the speed of response to a DNS query.

In the first and second embodiments described above, the PANs 21 are provided for the respective domains D, and when the terminal apparatus 31 moves from one domain D to another and issues a request for an application, the already-assigned guide-target proxy server 22 is used. Accordingly, this approach is effective when the domain D1 from which the terminal apparatus 31 moves and the domain D2 to which it moves are located close to each other.

However, there are cases in which the distance between the domain D1 from which the terminal apparatus 31 moves and the domain D2 to which it moves is large. For example, when the movement-source domain D1 is in California and the movement-destination domain D2 is in New York, the terminal apparatus 31 uses the guide-target proxy server 22 in California all the way from New York, which may lead to a reduction in the speed of response to a DNS query. Accordingly, an embodiment for dealing with such a situation will be described below as a third embodiment. Configurations that are the same as or similar to those in the data providing system 1 according to the first embodiment are denoted by the same reference numerals, and descriptions of redundant configurations and operations are not given hereinafter.

Third Embodiment

Figure 17:
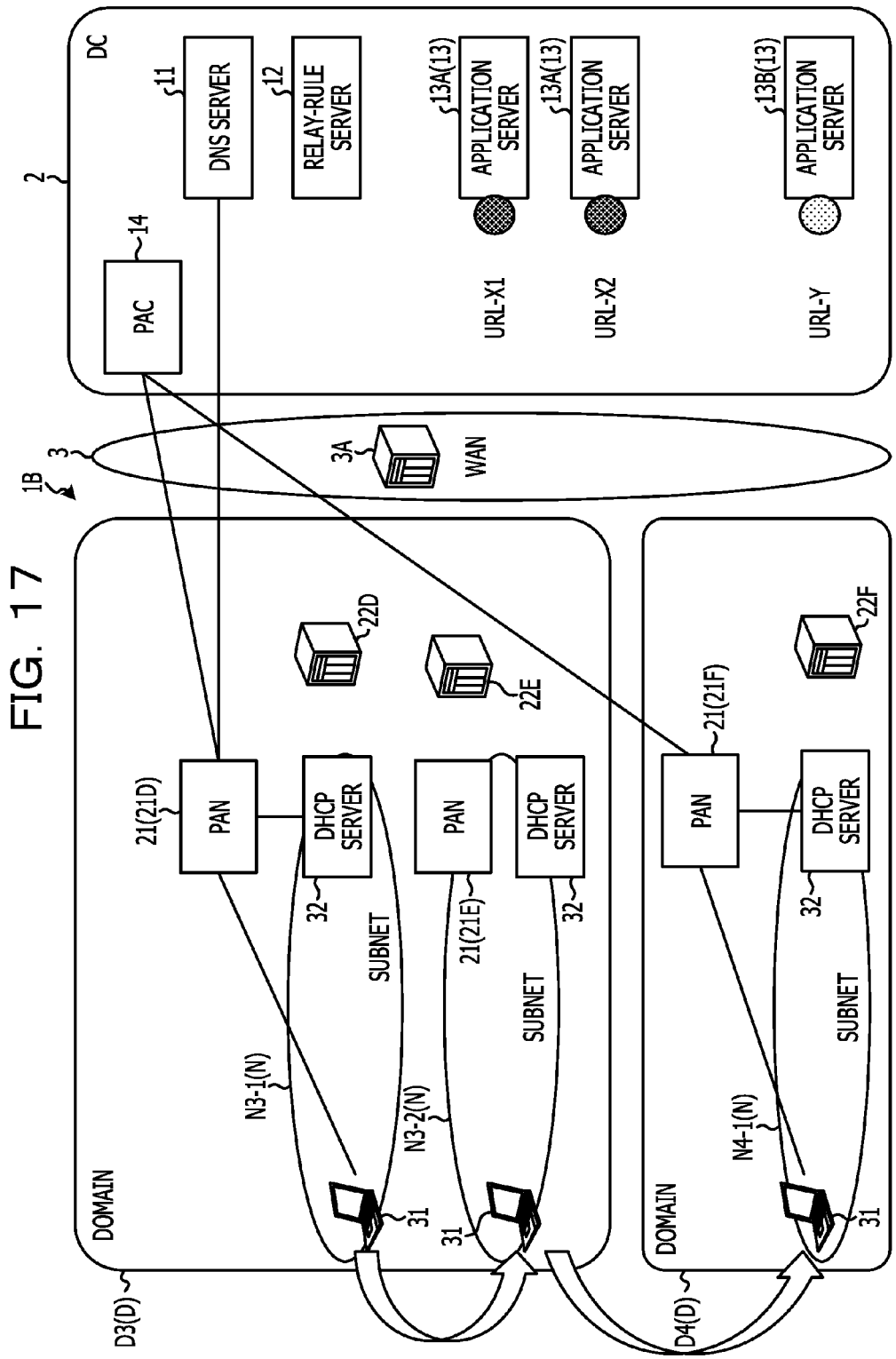
FIG. 17 is a block diagram illustrating an example of a data providing system according to a third embodiment.

FIG. 17 is a block diagram illustrating an example of a data providing system according to the third embodiment. As illustrated in FIG. 17, in a domain D3 in a data providing system 1B, PANs 21 (21D and 21E) are placed in respective subnets N (N3-1, N3-2). The PAN 21D reports assignment information of a terminal apparatus 31 to the PAC 14. The PAC 14 then distributes the assignment information to all PANs (including the PAN 21E) in the domain D3 in which the PAN 21D that has transmitted the assignment information is placed. The PAC 14, however, prohibits distribution of the assignment information to a PAN 21 (21F) in a domain D4 that is different from the domain D3 in which the PAN 21D that has transmitted the assignment information is placed.

It is assumed that, for example, when the terminal apparatus 31 is located in a subnet N3-1 in the domain D3, the terminal apparatus 31 issues an application request to the PAN 21D. In this case, when the IP address of a guide-target proxy server 22 for the terminal apparatus 31 that has issued the application request is supplied to the terminal apparatus 31, the PAN 21D registers assignment information in the assignment table 54. In addition, the PAN 21D reports the assignment information to the PAC 14.

Upon receiving the assignment information from the PAN 21D, the PAC 14 distributes the assignment information to the other PAN 21 (21E) in the same domain D3 as that of the PAN 21D. The PAC 14 prohibits distribution of the assignment information to all of the PANs 21 in the domain D4 that is different from that of the PAN 21D that has transmitted the assignment information. Upon receiving the assignment information from the PAC 14, the PANs 21D and 21E in the same domain D3 register the assignment information in the respective assignment tables 54.

As a result, even when the terminal apparatus 31 moves in the same domain D3, the PANs 21D and 21E in the domain D3 refer to the assignment tables 54 to report, to the terminal apparatus 31, the IP address of the guide-target proxy server 22 for the application request from the terminal apparatus 31. Based on the IP address of the guide-target proxy server 22, the terminal apparatus 31 may obtain cache data of a requested application from the guide-target proxy server 22.

However, when the terminal apparatus 31 moves from the domain D3 to the domain D4, even if the PAN 21F in the movement-destination domain D4 refers to the assignment table 54, the PAN 21F fails to find the guide-target proxy server 22 for the application request from the terminal apparatus 31. Thus, the PAN 21F assigns a new guide-target proxy server 22 (22F) in the movement-destination domain D4. The PAN 21F in the movement-destination domain D4 then reports the assignment information to the PAC 14. Additionally, the PAC 14 distributes the assignment information to PANs 21 in the same domain D4 as that of the PAN 21F that has reported the assignment information. The PANs 21 in the same domain D4 register the received assignment information in the respective assignment tables 54.

For example, when the terminal apparatus 31 moves a large distance from the domain D3 to the domain D4, the PAN 21F in the movement-destination domain D4 uses the guide-target proxy server 22 for a requested application in the domain D4. As a result, since the terminal apparatus 31 uses the guide-target proxy server 22 in the movement-destination domain D4 without using the guide-target proxy server 22 in the domain D3 distant from the movement-destination domain D4, it is possible to inhibit a reduction in the speed of response to a DNS query, which is caused by the increase of the communication distance.

Although each PAN 21 in the above-described embodiments is separately provided from each proxy server 22, the PAN 21 may also be built into the proxy server 22.

Upon assignment of an IP address to the terminal apparatus 31, the DHCP server 32 in the above-described embodiments transmits the lease information of the terminal apparatus 31 to the PAN 21. However, the PAN 21 may periodically obtain the lease information of the terminal apparatus 31 from the DHCP server 32 by a pull approach.

Although the PAN 21 in the above-described embodiments identifies the terminal MAC address by using the transmission-source IP address in the DNS query, it is also conceivable to identify the terminal MAC address by using the transmission-source MAC address in the DNS query. However, when a router is provided between the terminal apparatus 31 and the PAN 21, the transmission-source MAC address in the DNS query serves as the MAC address of the router and thus the terminal MAC address is not identifiable. Thus, the PAN 21 is adapted to refer to the terminal table 51 to identify the terminal MAC address by using the transmission-source IP address in the DNS query.

In the first embodiment, the PANs 21 are provided for the respective domains D, and when assignment information is registered in the assignment table 54 in one PAN 21, the assignment information is distributed to the PANs 21 in other domains D. However, the assignment-information distribution performed by the PAC 14 may also be prohibited between the PANs 21 in the domains D far away from each other. In this case, upon receiving a distribution request for the assignment information from one PAN 21, the PAC 14 identifies another domain D located at a remote place at a predetermined distance or more from the domain D of the PAN 21 and prohibits distribution of the assignment information to the PANs 21 in the other domain D at that remote location.

The embodiments may be applied to a system in which the terminal apparatus 31 is, for example, sensor equipment, the proxy server 22 is, for example, a gateway, and a measurement application for the sensor equipment is supplied from the application server 13 to the sensor equipment via the gateway.

When there is an already-assigned guide-target proxy server 22 corresponding to the MAC address of the terminal apparatus 31 that has issued an application request and a requested-application-server name, the PAN 21 in the above-described embodiments supplies the IP address of the guide-target proxy server 22 to the terminal apparatus 31 that has issued the application request. However, when there is an already-assigned guide-target proxy server 22 corresponding to the MAC address of the terminal apparatus 31 that has issued an application request, the PAN 21 may supply the IP address of the guide-target proxy server 22 to the terminal apparatus 31 that has issued the application request.

The elements of the illustrated apparatuses may or may not be physically configured as illustrated. That is, specific forms of distribution/integration of the elements are not limited to those illustrated, and all or a portion thereof may be functionally or physically distributed or integrated in an arbitrary manner, depending on various loads, usage states, and so on.

In addition, by analyzing and executing a program, a CPU or a microcomputer, such as a micro processing unit (MPU) or a micro controller unit (MCU), may perform all or an arbitrary one of the various processing functions to be executed by each apparatus. Needless to say, wired logic hardware may perform all or an arbitrary one of the various processing functions.

Figure 18:
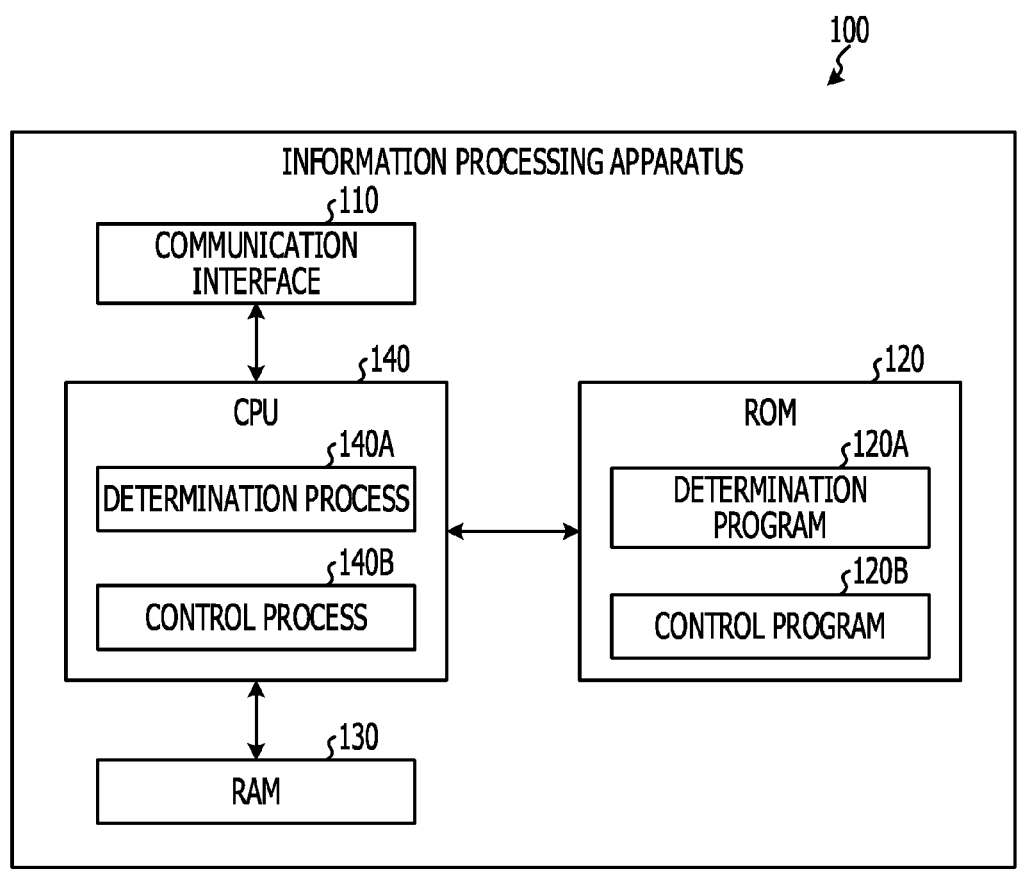
FIG. 18 is a block diagram illustrating an information processing apparatus that executes a proxy assignment program.

The various types of processing described in the above embodiments may be performed by causing an information processing apparatus to execute a prepared program. Accordingly, a description below will be given on an example of an information processing apparatus that executes a program having functions that are the same as or similar to those of the above-described embodiments. FIG. 18 is a block diagram illustrating an information processing apparatus 100 that executes the proxy assignment program.

As illustrated in FIG. 18, the information processing apparatus 100 that executes the proxy assignment program includes a communication interface 110, a read-only memory (ROM) 120, a random access memory (RAM) 130, and a CPU 140.

The proxy assignment program that realizes functions that are the same as or similar to those of the above-described embodiments is stored in the ROM 120. The proxy assignment program may also be stored in a recording medium that is readable via a drive (not illustrated), rather than in the ROM 120. Examples of the recording medium include portable recording media, such as a compact disk read-only memory (CD-ROM), a digital versatile disk (DVD), a Universal Serial Bus (USB) memory, and a Secure Digital (SD) card, and semiconductor memories such as a flash memory. The proxy assignment program may include a determination program 120A and a control program 120B.

The determination program 120A and the control program 120B may be integrated together or distributed as appropriate.

The CPU 140 reads the determination program 120A and the control program 120B from the ROM 120 and executes the determination program 120A and the control program 120B. Based on the determination program 120A and the control program 120B, the CPU 140 serves as a determination process 140A and a control process 140B.

By using the communication interface 110, the CPU 140 obtains data from a storage server in response to a data request from a terminal apparatus and assigns, from among a plurality of proxy servers, a proxy server in which the obtained data is to be stored. In addition, upon detecting a data request transmitted from a terminal apparatus, the CPU 140 determines whether or not an already-assigned proxy server corresponding to the MAC address of the terminal apparatus exists. When an already-assigned proxy server exists, the CPU 140 reports the IP address of the assigned proxy server to the terminal apparatus from which the data request has been received. As a result, it is possible to ensure that data related to the same data request from the same terminal apparatus is not redundantly registered in a plurality of proxy servers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A proxy assignment apparatus comprising:
   a processor or wired logic hardware configured to
   detect a first data request issued from a terminal apparatus, the first data request being for requesting first data,
   determine whether a first proxy server satisfies a condition, the condition being that the first proxy server corresponds to a media access control (MAC) address of the terminal apparatus,
   report a first internet protocol (IP) address of the first proxy server to the terminal apparatus when the processor or wired logic hardware determines the first proxy server satisfies the condition, select, when the processor or the wired logic hardware determines the first proxy server does not satisfy the condition, a second proxy server from among a plurality of proxy servers,
   store, as first assignment information, the MAC address, a data identifier for identifying the first data, and a second proxy identifier for identifying the second proxy server in association with each other in a first storage unit,
   report, upon storing the first assignment information in the first storage unit, the first assignment information to a control server that manages the proxy assignment apparatus, and
   store, upon receiving second assignment information from the control server, the second assignment information in the first storage unit.

2. The proxy assignment apparatus according to claim 1, wherein
   the condition is that the first proxy server corresponds to the MAC address and data identifier for identifying the first data.

3. The proxy assignment apparatus according to claim 2, further comprising:
   a second storage unit configured to store therein a second IP address of the terminal apparatus and the MAC address in association with each other; and
   the first storage unit, the first storage unit being configured to store therein the MAC address, the data identifier, and a first proxy identifier for identifying the first proxy server in association with each other,
   wherein
   the processor or wired logic hardware is configured to
      obtain the MAC address by referring to the second storage unit upon detecting the first data request, the MAC address corresponding to a third IP address of a transmission source that has transmitted the first data request, the third IP address being included in the first data request, and
      determine whether the first proxy server exists by referring to the first storage unit.

4. The proxy assignment apparatus according to claim 1, wherein
   the processor or wired logic hardware is configured to
      select the second proxy server on basis of an amount of load of each of the plurality of proxy servers.

5. The proxy assignment apparatus according to claim 3, wherein
   the processor or wired logic hardware is configured to
      store, upon obtaining the second IP address and the MAC address from an IP address assignment server that has assigned the second IP address to the terminal apparatus, the second IP address and the MAC address in the second storage unit.

6. The proxy assignment apparatus according to claim 1, wherein
   the processor or wired logic hardware is configured to
      transfer, upon receiving a second data request from the terminal apparatus, the second data request to a management server that manages a data request identifier for identifying whether second data that is requested by the second data request is obtained from a storage server via a second proxy server,
      receive the data request identifier as a response to the second data request from the management server, and
      determine, on basis of the data request identifier, whether the second data is obtained from the storage server via the second proxy server.

7. The proxy assignment apparatus according to claim 1, wherein the first storage unit is configured to store therein a data request identifier for identifying whether second data that is requested by a second data request is obtained from a storage server via a second proxy server, and
   the processor or wired logic hardware is configured to
      determine, upon receiving the second data request from the terminal apparatus, whether the second data is obtained from the storage server via the second proxy server by referring to the first storage unit.

8. The proxy assignment apparatus according to claim 1, wherein
   the terminal apparatus is sensor equipment including a sensor,
   the first data is a program for measurement using the sensor, and the first proxy server is a gateway via which the program is supplied from an application server.

9. A non-transitory computer-readable recording medium having stored therein a program for causing a computer to execute a process, the process comprising:

detecting a first data request issued from a terminal apparatus, the first data request being for requesting first data;

determining whether a first proxy server satisfies a condition, the condition being that the first proxy server corresponds to a media access control (MAC) address of the terminal apparatus;

reporting a first internet protocol (IP) address of the first proxy server to the terminal apparatus when the determining determines the first proxy server satisfies the condition;

selecting a second proxy server from among a plurality of proxy servers when the first proxy server does not satisfy the condition;

storing, as first assignment information, the MAC address, a data identifier for identifying the first data, and a second proxy identifier for identifying the second proxy server in association with each other in a first storage unit;

reporting, upon storing the first assignment information in the first storage unit, the first assignment information to a control server that manages the proxy assignment apparatus; and storing, upon receiving second assignment information from the control server, the second assignment information in the first storage unit.

10. A method for assigning a proxy, the method comprising:

detecting, by a proxy assignment apparatus, a first data request issued from a terminal apparatus, the first data request being for requesting first data;

determining whether a first proxy server satisfies a condition, the condition being that the first proxy server corresponds to a media access control (MAC) address of the terminal apparatus;

reporting a first internet protocol (IP) address of the first proxy server to the terminal apparatus when the determining determines the first proxy server satisfies the condition;

selecting a second proxy server from among a plurality of proxy servers when the first proxy server does not satisfy the condition;

storing, as first assignment information, the MAC address, a data identifier for identifying the first data, and a second proxy identifier for identifying the second proxy server in association with each other in a first storage unit;

reporting, upon storing the first assignment information in the first storage unit, the first assignment information to a control server that manages the proxy assignment apparatus; and storing, upon receiving second assignment information from the control server, the second assignment information in the first storage unit.

\* \* \* \* \*